US012268567B2

(12) United States Patent
Schmid et al.

(10) Patent No.: US 12,268,567 B2
(45) Date of Patent: Apr. 8, 2025

(54) APPARATUS, SYSTEM, METHOD OF POST-CURING AN ARTICLE, AND POST-CURED ARTICLE

(71) Applicant: SOLVENTUM INTELLECTUAL PROPERTIES COMPANY, Maplewood, MN (US)

(72) Inventors: Rudolf Schmid, Eichenau (DE); Ralf Kelz, Germering (DE); Christian A. Richter, Feldafing (DE); Anja Friedrich, Unterschleißheim (DE); James D. Hansen, White Bear Lake, MN (US); Saswata Chakraborty, Sunnyvale, CA (US); Benjamin C. MacMurray, Minneapolis, MN (US); Daniel D. Oberpertinger, Herrsching (DE)

(73) Assignee: Solventum Intellectual Properties Company, Maplewood, MN (US)

(*) Notice: Subject to any disclaimer, the term of this patent is extended or adjusted under 35 U.S.C. 154(b) by 254 days.

(21) Appl. No.: 17/637,488

(22) PCT Filed: Sep. 8, 2020

(86) PCT No.: PCT/IB2020/058330
§ 371 (c)(1),
(2) Date: Feb. 23, 2022

(87) PCT Pub. No.: WO2021/048733
PCT Pub. Date: Mar. 18, 2021

(65) Prior Publication Data

US 2022/0273409 A1 Sep. 1, 2022

Related U.S. Application Data

(60) Provisional application No. 62/899,417, filed on Sep. 12, 2019.

(51) Int. Cl.
*B29C 64/00* (2017.01)
*A61C 13/00* (2006.01)
(Continued)

(52) U.S. Cl.
CPC ........ *A61C 19/003* (2013.01); *A61C 13/0004* (2013.01); *B29C 64/135* (2017.08);
(Continued)

(58) Field of Classification Search
CPC .............................. B29C 64/135; B29C 71/04
See application file for complete search history.

(56) References Cited

U.S. PATENT DOCUMENTS

| | | | |
|---|---|---|---|
| 3,076,363 | A | 2/1963 | Hack |
| 4,412,134 | A | 10/1983 | Herold |

(Continued)

FOREIGN PATENT DOCUMENTS

| | | |
|---|---|---|
| CA | 2941624 | 3/2018 |
| CN | 1605393 | 4/2005 |

(Continued)

OTHER PUBLICATIONS https://hackaday.io/project/16701-adam-dlp-3d-printer/log/55919-vacuum-uv-curing (Year: 2017).*

(Continued)

*Primary Examiner* — Nicholas R Krasnow

(57) ABSTRACT

The apparatus (1000) includes a housing (110), a chamber (120) disposed in the housing, at least two light emitting diodes (LEDs) (130) disposed within the housing (110), and a user interface (140) disposed on an exterior (112) of the housing. The chamber (120) is adaptable to each of an open, closed, and hermetically sealed configuration. The chamber (120) includes a material transparent to actinic radiation and light from the LEDs (130) enters the chamber from more than one direction. The user interface (140) includes a
(Continued)

display (142) and program switches (144) configured to adjust at least three operational parameters of the apparatus. The apparatus (1000) further includes a vacuum pump (150) operatively coupled to the chamber (120). The system includes the apparatus (1000) and an article (180). An article includes layers of at least one photopolymerized crosslinked composition and a low extractable component content. A method of post-curing an article includes obtaining an article (180), placing the article in an apparatus (1000), inputting a post-cure program or accessing a saved post-cure program through the user interface (140), and running the post-cure program. The post-cure program includes light intensity provided by a light source (130) and length of time of light provided by the light source (130), plus a delay time between initiation of light provided by the light source (130) and initiation of vacuum pulled by the vacuum pump (150) and/or a delay time between initiation of vacuum pulled on an interior of the chamber (120) by the vacuum pump (150) and initiation of light provided by the light source (130).

9 Claims, 9 Drawing Sheets

(51) Int. Cl.

*A61C 13/15* (2006.01)
*B29C 64/135* (2017.01)
*B29C 71/04* (2006.01)
*B29L 31/00* (2006.01)
*B33Y 40/20* (2020.01)
*B33Y 70/10* (2020.01)
*B33Y 80/00* (2015.01)

(52) U.S. Cl.

CPC ....... *B29C 71/04* (2013.01); *B29L 2031/7536* (2013.01); *B33Y 40/20* (2020.01); *B33Y 70/10* (2020.01); *B33Y 80/00* (2014.12)

(56) References Cited

U.S. PATENT DOCUMENTS 4,421,987 A 12/1983 Herold
4,571,665 A 2/1986 Herold
5,354,414 A 10/1994 Feygin
5,482,659 A 1/1996 Sauerhofer
5,741,368 A 4/1998 Sahbari
5,901,593 A 5/1999 Fritz
6,234,948 B1 5/2001 Yavilevich
6,482,576 B1 11/2002 Farnworth
6,579,917 B1 6/2003 Noguchi
6,624,128 B1 9/2003 Smiley
7,255,669 B2 8/2007 Shimizu
9,205,601 B2 12/2015 Desimone
9,360,757 B2 6/2016 Desimone
9,421,582 B1 8/2016 Zolnierek
10,118,193 B1 11/2018 Lin
10,160,194 B2 12/2018 Atwood
10,189,057 B2 1/2019 Craft
11,155,028 B1 10/2021 Zhang
2004/0023145 A1 2/2004 Moussa et al.
2004/0051222 A1 3/2004 Cattell
2004/0069770 A1* 4/2004 Cary .................... B32B 37/003 219/522
2004/0159340 A1 8/2004 Hiatt
2005/0103360 A1 5/2005 Tafoya
2007/0031791 A1 2/2007 Cinader, Jr.
2007/0205528 A1 9/2007 Patel et al.
2008/0063809 A1* 3/2008 Lee .................. H01L 21/67115 257/E21.279
2008/0169585 A1 7/2008 Zinniel
2008/0248442 A1 10/2008 Raby
2008/0276867 A1* 11/2008 Schaller ........... H01L 21/67173 118/719
2012/0195994 A1 8/2012 Ei-Siblani
2013/0295215 A1 11/2013 Wu
2014/0131908 A1 5/2014 Sun
2015/0275026 A1* 10/2015 Jennings .............. A61L 29/085 514/254.11
2015/0343705 A1 12/2015 Chen
2017/0100899 A1 4/2017 Ei-Siblani
2017/0157862 A1 6/2017 Bauer
2017/0250095 A1 8/2017 Kim
2017/0291360 A1 10/2017 Franke et al.
2017/0326787 A1 11/2017 Wattyn
2018/0141243 A1 5/2018 Mochizuki
2019/0143597 A1 5/2019 Huang
2019/0193148 A1 6/2019 Kiener
2019/0209264 A1 7/2019 Seo
2020/0109357 A1 4/2020 Jahns
2020/0198233 A1 6/2020 Yang
2020/0337813 A1 10/2020 Kirchner
2022/0332904 A1* 10/2022 Chou ..................... C08L 75/04

FOREIGN PATENT DOCUMENTS

CN 101564719 10/2009
CN 1973752 9/2010
CN 102989595 3/2013
CN 103522546 1/2014
CN 204076853 1/2015
CN 105436120 3/2016
CN 205008301 3/2016
CN 205058635 3/2016
CN 105562395 5/2016
CN 105754757 7/2016
CN 103934940 2/2017
CN 106493943 3/2017
CN 206287523 6/2017
CN 206589347 10/2017
CN 206632024 11/2017
CN 207140365 3/2018
CN 107890128 4/2018
CN 207533520 6/2018
CN 208004270 10/2018
CN 208006262 10/2018
DE 3209547 10/1982
DE 19936931 2/2001
DE 102006060720 6/2008
DE 102009061069 6/2011
DE 102015120211 5/2017
DE 102017115043 1/2018
DE 102016216839 3/2018
EP 0420614 4/1991
EP 2216105 8/2010
EP 3281729 2/2018
EP 3378435 9/2018
GB 825389 12/1959
GB 1243944 8/1971
JP 62000005 1/1987
JP H04-343361 11/1992
JP H09-193159 7/1997
JP 2011000566 1/2011
TW I221100 9/2004
WO WO 1992-04171 3/1992
WO WO 1997-12759 4/1997
WO WO 2000-67981 11/2000
WO WO 2003-089218 10/2003
WO WO 2005-113240 12/2005
WO WO 2009-003696 1/2009
WO WO 2010-071759 6/2010
WO WO 2015-070165 5/2015
WO WO 2015-131250 9/2015
WO WO 2016-191162 12/2016
WO WO 2016-191538 12/2016
WO WO 2017-017272 2/2017
WO WO 2017-108645 6/2017
WO WO 2018-026640 2/2018
WO WO 2018-038954 3/2018
WO WO 2018-052226 3/2018
WO WO 2018-119026 6/2018

(56) References Cited

FOREIGN PATENT DOCUMENTS

| | | |
|---|---|---|
| WO | WO 2018-222395 | 12/2018 |
| WO | WO 2018-231583 | 12/2018 |
| WO | WO 2019-023009 | 1/2019 |
| WO | WO 2019-023120 | 1/2019 |
| WO | WO 2019-102304 | 5/2019 |
| WO | WO 2019-103855 | 5/2019 |
| WO | WO 2019-104072 | 5/2019 |
| WO | WO 2019-104079 | 5/2019 |
| WO | WO 2019-111208 | 6/2019 |
| WO | WO 2019-175716 | 9/2019 |
| WO | WO 2020-003169 | 1/2020 |
| WO | WO 2020-003197 | 1/2020 |
| WO | WO 2020-005413 | 1/2020 |
| WO | WO 2020-030338 | 2/2020 |
| WO | WO 2020-104873 | 5/2020 |
| WO | WO 2020-157598 | 8/2020 |
| WO | WO 2021-024162 | 2/2021 |

OTHER PUBLICATIONS

E1—https://www.youtube.com/watch?v=2ywWfdY1dJ0 (Year: 2016).*

E2—Reymus, M., Lümkemann, N. and Stawarczyk, B., 2019. 3D-printed material for temporary restorations: Impact of print layer thickness and post-curing method on degree of conversion. Int. J. Comput. Dent, 22(3), pp. 231-237 (Year: 2019).*

E3—https://whwplastics.com/wp-content/uploads/2019/07/WHW-Catalogue_3D.pdf (Year: 2019).*

E4—https://dentallabnetwork.com/forums/threads/next-dent-ortho-clear-resin.28316/ (Year: 2018).*

PCU-LED manual; https://dentamidshop.dreve.de/daten/enu_dentamid_inst_pcu_led_n2_de_gb_fr.pdf?expired=1724159598.*

PubMed ID (PMID): 31463487 pp. 231-237, Language: German, English Reymus, Marcel / Lümkemann, Nina / Stawarczyk, Bogna (Year: 2019).*

3M ESPE AG, Dental Products—Sinfony™, "Light-Curing Composite for the Fabrication of Crowns, Bridges, Inlays, and Onlays", Instructions for Use, 146 pages.

CA3200 Controlled Atmosphere Cure Chamber, Clearstone Technologies, 1 page.

Dentsply, "Directions of Use Airblock", 2009, 13 pages.

Ivoclar Vivadent, "Liquid Strip Instructions for Use", 2003, 20 pages.

PCU LED Pioneering Technology, Dreve, 33 pages.

RS Cure, Rapidshape Dental, 1 page.

International Search Report for PCT International Application No. PCT/IB2020/058330, mailed on Dec. 2, 2020, 5 pages.

* cited by examiner

APPARATUS, SYSTEM, METHOD OF POST-CURING AN ARTICLE, AND POST-CURED ARTICLE

TECHNICAL FIELD

The present disclosure broadly relates to devices for post-curing articles, methods, and, post-cured articles.

BACKGROUND

Devices for radiation curing articles have been used in numerous industries; however, there remains a need for improvements in performance as well as user control of the devices.

SUMMARY

In a first aspect, an apparatus is provided. The apparatus includes a) a housing; b) a chamber disposed in the housing; c) at least two light emitting diodes (LEDs) disposed within the housing; and a user interface disposed on an exterior of the housing. The chamber is configured to be adaptable to each of an open configuration, a closed configuration, and a hermetically sealed configuration, and the chamber includes a material transparent to actinic radiation. Light from the at least two LEDs enters the chamber from more than one direction. The user interface includes a display and a plurality of program switches configured to adjust at least three operational parameters of the apparatus. The apparatus further includes a vacuum pump operatively connected to the chamber.

In a second aspect, an article is provided. The article includes a plurality of layers of at least one photopolymerized crosslinked composition. Further, the article contains 0.1% by weight or less of extractable components, based on the total weight of the article, when extracted with 5 volume percent ethanol in water. The article is made by a process including a) obtaining a photopolymerizable composition; b) selectively curing the photopolymerizable composition using actinic radiation to form an article having a plurality of layers of at least one photopolymerized composition; c) removing excess photopolymerizable composition from the article; d) placing the article in the apparatus of the first aspect; e) inputting a post-cure program or accessing a saved post-cure program through the user interface; and f) running the post-cure program. The post-cure program includes i) light intensity provided by the at least two LEDs, ii) length of time of light provided by the at least two LEDs, and at least one of iiia) delay time between initiation of light provided by the at least two LEDs and initiation of vacuum pulled by the vacuum pump or iiib) delay time between initiation of vacuum pulled on an interior of the chamber by the vacuum pump and initiation of light provided by the at least two LEDs.

In a third aspect, a method of post-curing an article is provided. The method includes a) obtaining an article; b) placing the article in an apparatus; c) inputting a post-cure program or accessing a saved post-cure program through the user interface; and d) running the post-cure program. The apparatus includes 1) a housing; 2) a chamber disposed in the housing; 3) at least one light source disposed within the housing; 4) a user interface disposed on an exterior of the housing, the user interface comprising a display and a plurality of program switches configured to adjust at least three operational parameters of the apparatus; and 5) a vacuum pump operatively connected to the chamber. The post-cure program includes i) light intensity provided by the at least one light source, ii) length of time of light provided by the at least one light source, and at least one of iiia) delay time between initiation of light provided by the at least one light source and initiation of vacuum pulled by the vacuum pump or iiib) delay time between initiation of vacuum pulled on an interior of the chamber by the vacuum pump and initiation of light provided by the at least one light source.

In a fourth aspect, another article is provided. The article is made by the method of the third aspect.

In a fifth aspect, a system is provided. The system includes a) an apparatus of the first aspect; and b) an article including at least one photopolymerized composition.

It has been discovered that apparatuses of the present disclosure can provide greater user control than previous devices. Moreover, methods of using the apparatuses and articles post-cured according to at least certain embodiments of this disclosure were found to provide articles having a low extractables content, e.g., as compared to instead using other post-curing methods.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1A:
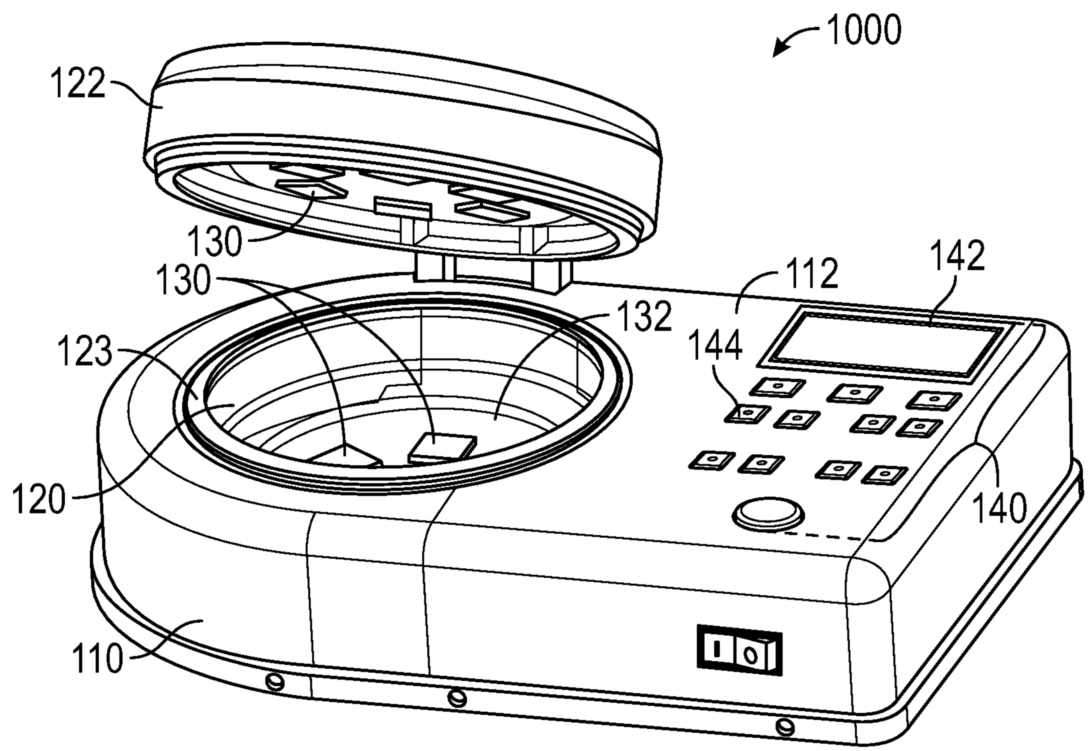
FIG. 1A is a generalized schematic diagram of an exemplary apparatus.

While the above-identified figures set forth several embodiments of the disclosure other embodiments are also contemplated, as noted in the description. The figures are not necessarily drawn to scale. Not every feature is illustrated in each figure. In all cases, this disclosure presents the invention by way of representation and not limitation.

DETAILED DESCRIPTION OF ILLUSTRATIVE EMBODIMENTS

As used herein, the term "essentially free" in the context of a composition being essentially free of a component, refers to a composition containing less than 1% by weight (wt. %), 0.5 wt. % or less, 0.25 wt. % or less, 0.1 wt. % or less, 0.05 wt. % or less, 0.001 wt. % or less, or 0.0001 wt. % or less of the component, based on the total weight of the composition.

As used herein, the term "polymeric" refers to containing at least one polymer.

As used herein, the term "cavity" refers to an empty space, which is defined by at least one wall of a (e.g., solid) object.

As used herein, "curing" means the hardening or partial hardening of a composition by any mechanism, e.g., by heat, light, radiation, e-beam, microwave, chemical reaction, or combinations thereof. As used herein, the term "hardenable" refers to a material that can be cured or solidified, e.g., by heating to remove solvent, heating to cause polymerization, chemical crosslinking, radiation-induced polymerization or crosslinking, or the like. As used herein, "cured" refers to a material or composition that has been hardened or partially hardened (e.g., polymerized or crosslinked) by curing.

As used herein, "transparent" refers to a material that has a thickness of 10 millimeters or less and has at least 50% transmittance, 70% transmittance, or optionally greater than 90% transmittance over a particular range of wavelengths.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Apparatuses

In a first aspect, the present disclosure provides an apparatus. The apparatus comprises:

a) a housing;

b) a chamber disposed in the housing, the chamber configured to be adaptable to each of an open configuration, a closed configuration, and a hermetically sealed configuration, wherein the chamber comprises a material transparent to actinic radiation;

c) at least two light emitting diodes (LEDs) disposed within the housing, wherein light from the at least two LEDs enters the chamber from more than one direction;

d) a user interface disposed on an exterior of the housing, the user interface comprising a display and a plurality of program switches configured to adjust at least three operational parameters of the apparatus; and e) a vacuum pump operatively connected to the chamber.

Apparatuses according to at least certain embodiments of the present disclosure advantageously provide increased user control over operation of the apparatuses.

Referring to FIGS. 1A-1D, an apparatus 1000 according to the first aspect comprises a housing 110 and a chamber 120 disposed in the housing 110. The housing 110 is typically formed of polymeric material, metal, and/or glass. The chamber 120 is configured to be adaptable to each of an open configuration (FIG. 1A, in which a hinged lid 122 is raised to allow access to the interior of the chamber 120), a closed configuration (FIG. 1B, in which the hinged lid 122 is shut), and a hermetically sealed configuration (FIG. 1C, in which the hinged lid 122 is shut and atmosphere cannot leave or enter the chamber due to the presence of a flexible sealing element 123 that can be seen in FIG. 1A). The inclusion of a flexible sealing element 123 assists in the capability of adjusting the pressure inside of the chamber 120 and maintaining a selected pressure (e.g., using a vacuum pump 150) within the chamber 120 when the hinged lid 122 is closed. One suitable flexible sealing element is a rubber o-ring.

The chamber 120 comprises a material transparent to actinic radiation. For instance, the chamber may comprise a material that is transparent to actinic radiation having wavelengths of at least 250 nanometers (nm), 300 nm or greater, 350 nm or greater, 400 nm or greater, 450 nm or greater, 500 nm or greater, 550 nm or greater, or 600 nm or greater; and 900 nm or less, 850 nm or less, 800 nm or less, 750 nm or less, 700 nm or less, or 650 nm or less. Stated another way, material of which at least a portion of the chamber is made is transparent to actinic radiation between 250 nm and 900 nm or between 250 and 650 nm. Suitable materials of which at least a portion of the chamber is made that are transparent to actinic radiation include glass and quartz. For example and without limitation, in some embodiments the chamber 120 comprises at least two, at least three, or at least four glass walls through which actinic radiation enters the chamber. In some embodiments, the chamber 120 comprises at least two, at least three, or at least four quartz walls through which actinic radiation enters the chamber. Combinations of glass and quartz can be included in the same chamber, if desired. In the embodiments shown in FIGS. 1A-1D, the chamber 120 is cylindrical and has one curved side wall.

At least two light emitting diodes (LEDs) 130 are disposed within the housing 110, such that light from the at least two LEDs 130 enters the chamber 120 from more than one direction. In some embodiments, a first LED is positioned to direct light through a first major surface of the chamber 121 and a second LED is positioned to direct light through an opposing second major surface of the chamber 123. In other embodiments, a floor of the chamber is the first major surface of the chamber and a lid of the chamber 122 is the second major surface of the chamber.

Figure 1B:
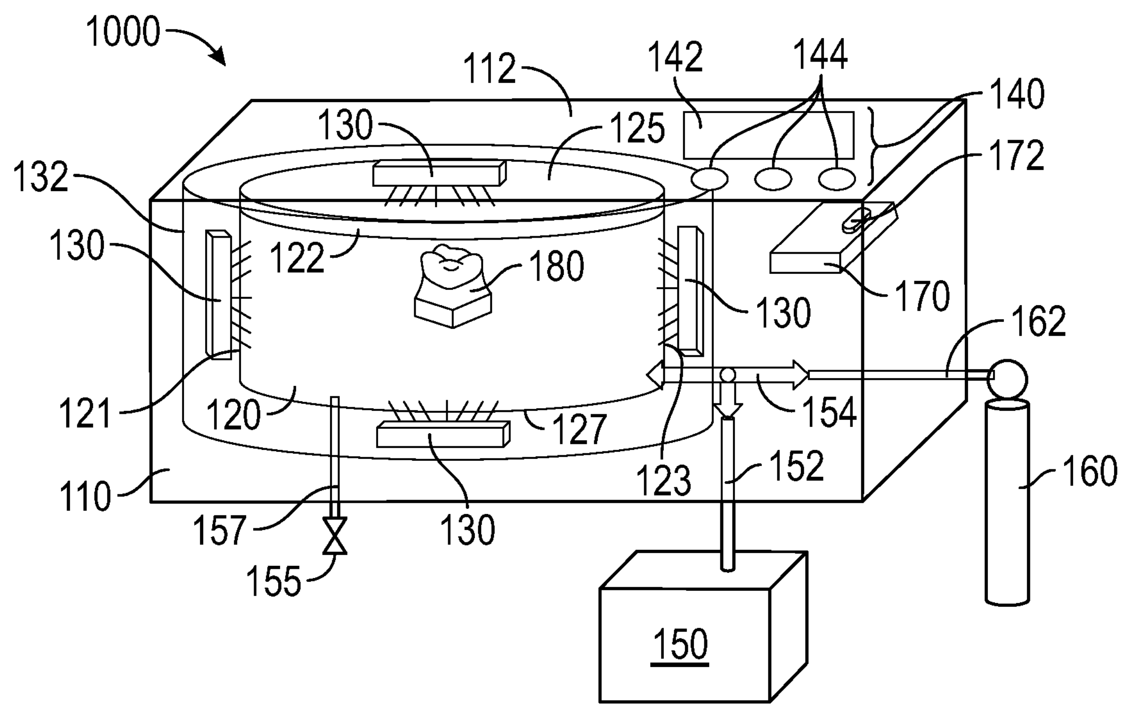
FIG. 1B is a generalized schematic diagram of an exemplary system including an apparatus and an article.

Referring to FIG. 1B, in some embodiments the apparatus 1000 further comprises a third LED positioned to direct light through a third major surface 125 of the chamber, wherein the third major surface 125 is directly adjacent to each of the first major surface of the chamber 121 and the second major surface of the chamber 123. Similarly, in some embodiments the apparatus 1000 further comprises a fourth LED positioned to direct light through a fourth major surface of the chamber 127, wherein the fourth major surface 127 is opposite the third major surface of the chamber 125. The use of at least two LEDs directing light from different directions can assist in exposing up to an entire sample to radiation simultaneously during the post-cure treatment. It will be understood that reference to "a first LED" encompasses the presence of more than one LED located at the position of the first LED, e.g., an array of individual LED bulbs may be provided as each of the first LED, the second LED, etc., rather than "a first LED" being limited to a single LED bulb.

In some embodiments, each of the LEDs provide light having a peak wavelength between 250 nm and 500 nm. In certain embodiment, at least two LEDs are present that provide light having a peak wavelength below 360 nm, above 460 nm, or both. Preferably, the (e.g., at least two) LEDs provide a light intensity of 50 milliwatts per square centimeter ($mW/cm^2$), or greater, 100 $mW/cm^2$ or greater, 150 $mW/cm^2$ or greater, 200 $mW/cm^2$ or greater, 250 $mW/cm^2$ or greater, or 300 $mW/cm^2$ or greater; and 500 $mW/cm^2$ or less, 450 $mW/cm^2$ or less, 400 $mW/cm^2$ or less, or 350 $mW/cm^2$ or less. Stated another way the LEDs may provide a light intensity of 50 to 500 $mW/cm^2$ or 300 to 500 $mW/cm^2$.

Figure 1C:
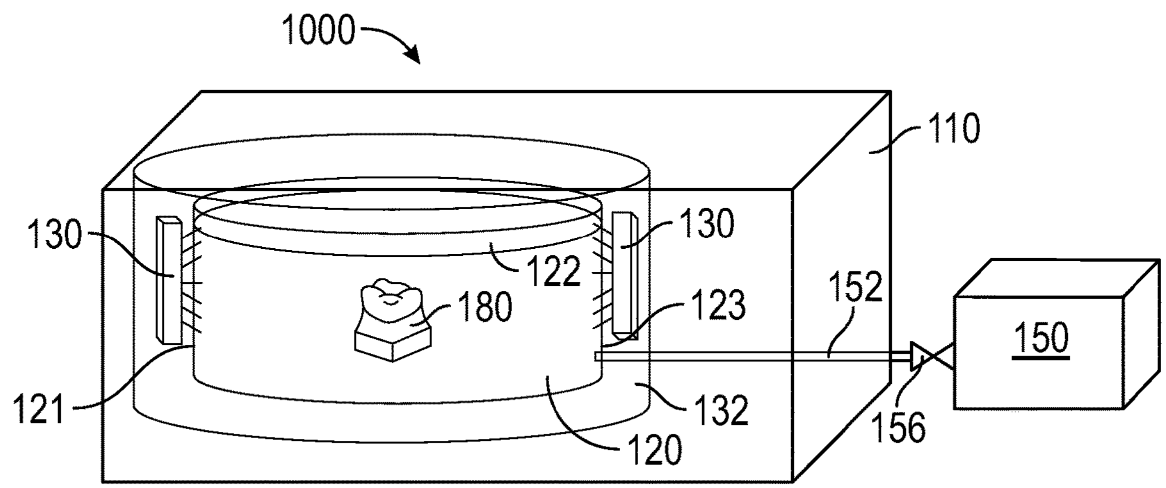
FIG. 1C is a generalized schematic diagram of a system including a portion of an exemplary apparatus and an exemplary article.
Figure 1D:
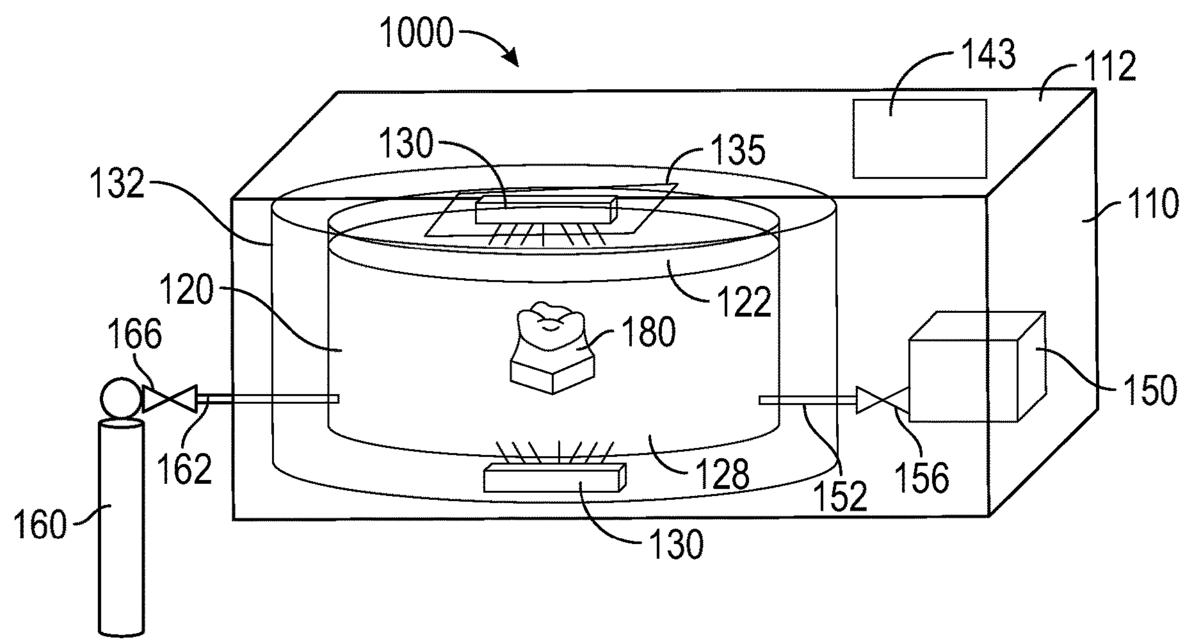
FIG. 1D is a generalized schematic diagram of another system including a portion of an exemplary apparatus and an exemplary article.

Referring to FIG. 1D, in some embodiments, the apparatus 1000 further comprises a diffusing element 135 disposed between at least one LED 130 and the chamber 120. A diffusing element is an optical element or a collection of elements having light transmission of at least 50%. Diffusing elements can be volume diffusers such as diffuser plates, or foams. They can also be surface diffusers, diffractive or holographic diffusers, bead coated substrates, or surface structure on substrates. An exemplary surface diffuser is available, for example, as an optical ground glass diffuser from Edmund Optics Inc., Barrington, USA. The apparatus may include a diffusing element positioned to diffuse light provided from any one or more of the light sources; e.g., an apparatus having four light sources may include one, two, three, or four separate diffusing elements.

In many embodiments, the apparatus 1000 further comprises a reflective material 132 positioned in the housing 110 to reflect actinic radiation through a first major surface of the chamber 121 or an opposing second major surface of the chamber 123. Suitable reflective materials include for instance and without limitation, metals such as aluminum or silver. The reflective material is optionally a layer that is either self-supporting or is a coating layer on a substrate (e.g., a polymeric and/or a glass substrate).

The apparatus 1000 further comprises a user interface 140 disposed on an exterior 112 of the housing. The user interface 140 comprises a display 142 and a plurality of program switches 144 configured to adjust at least three operational parameters of the apparatus. In addition, the apparatus 1000 comprises a vacuum pump 150 operatively connected to the (e.g., curing) chamber 120, for instance using tubing 152 connected to the vacuum pump 150 and to the chamber 120, placing the two in fluid communication with each other. As used herein, "operatively connected" refers to two structures and/or devices that are attached (either directly or indirectly) such that each structure and/or device is capable of functioning with the other. For example, a vacuum pump may be operatively connected to a chamber using tubing, wherein the vacuum pump lowers the pressure in the chamber by pulling a vacuum through the tubing between the vacuum pump and the chamber to evacuate gas from the chamber. An advantage of employing a vacuum evacuation of the chamber is that it will assist in removing volatile components in the article, if present in the particular article disposed in the chamber. Further, oxygen can be a cure inhibitor, thus removing ambient oxygen from the chamber may assist in increasing the extent of cure, cure speed, or both, during post-curing of the article.

Preferably, the vacuum pump is configured to achieve an absolute pressure inside the chamber of 0.1 millibars (mbar) or greater, 0.25 mbar or greater, 0.5 mbar or greater, 0.75 mbar or greater, 1 mbar or greater, 2 mbar or greater, 3 mbar or greater, 4 mbar or greater, or 5 mbar or greater; and 30 mbar or less, 27 mbar or less, 25 mbar or less, 23 mbar or less, 20 mbar or less, 17 mbar or less, 15 mbar or less, 12 mbar or less, or 10 mbar or less. Stated another way, the vacuum pump can be configured to achieve an absolute pressure inside the chamber of 0.1 to 30 mbar, 5 to 20 mbar, or 0.1 to 10 mbar. The extent of vacuum within the chamber can vary according to the particular application. In the embodiment shown in FIG. 1B, the vacuum pump 150 is located on the exterior of the housing 110, and an optional three-way valve 154 is shown that connects the chamber 120 to the vacuum pump 150 and/or to a gas source 160. The three-way valve 154 also connects to tubing 162 that is connected to the gas source 160. Other typical connectors such as fittings or valves could optionally be used in conjunction with the vacuum pump 150. In the embodiment shown in FIG. 1D, the vacuum pump 150 is located within the housing 110 and a first valve 156 and a second valve 166 are each operatively connected to the chamber 120 (e.g., via tubing 152 and 162, respectively). The first valve 156 operatively connects the chamber 120 to the vacuum pump 150 and the second valve 166 operatively connects the chamber 120 to the gas source 160. Suitable gas sources include, for example, a container (e.g., pressurized gas cylinder) holding compressed gas, e.g., an inert gas. Typical inert gases for use with the apparatus include nitrogen, argon, and/or helium. An advantage of employing both a vacuum and a gas is providing control over the contents of the atmosphere of the entire chamber. This is contrast to introducing a gas into the chamber without first removing the ambient atmosphere, wherein a possibility exists that the gas does not completely displace the ambient atmosphere, particularly around an article to be post-cured.

Referring to FIG. 1B, an exemplary apparatus 1000 is shown in which an optional release valve 155 operatively connects the chamber 120 to an exterior of the housing 110, such as through tubing 157. In use, the release valve provides a conduit through which pressure can be equalized between the interior of the chamber and ambient pressure outside of the apparatus. This is advantageous for being able to open the lid of the chamber following use of a vacuum or a gas within the chamber.

To accommodate a change in pressure, preferably the chamber 120 is formed of material(s) capable of maintaining its structural integrity at a range of internal pressures. In an embodiment, a chamber comprises a toughened safety glass with a compressive strength of 700-900 N/mm. The glass thickness can be calculated according to DIN standard 7080:2005-05 "Pressure resistant circular sight glasses of borosilicate glass without limitation in the range of low temperature". The glass thickness needed for a particular chamber is dependent on the size of the chamber being formed. One suitable glass thickness is approximately 5 millimeters.

Figure 1E:
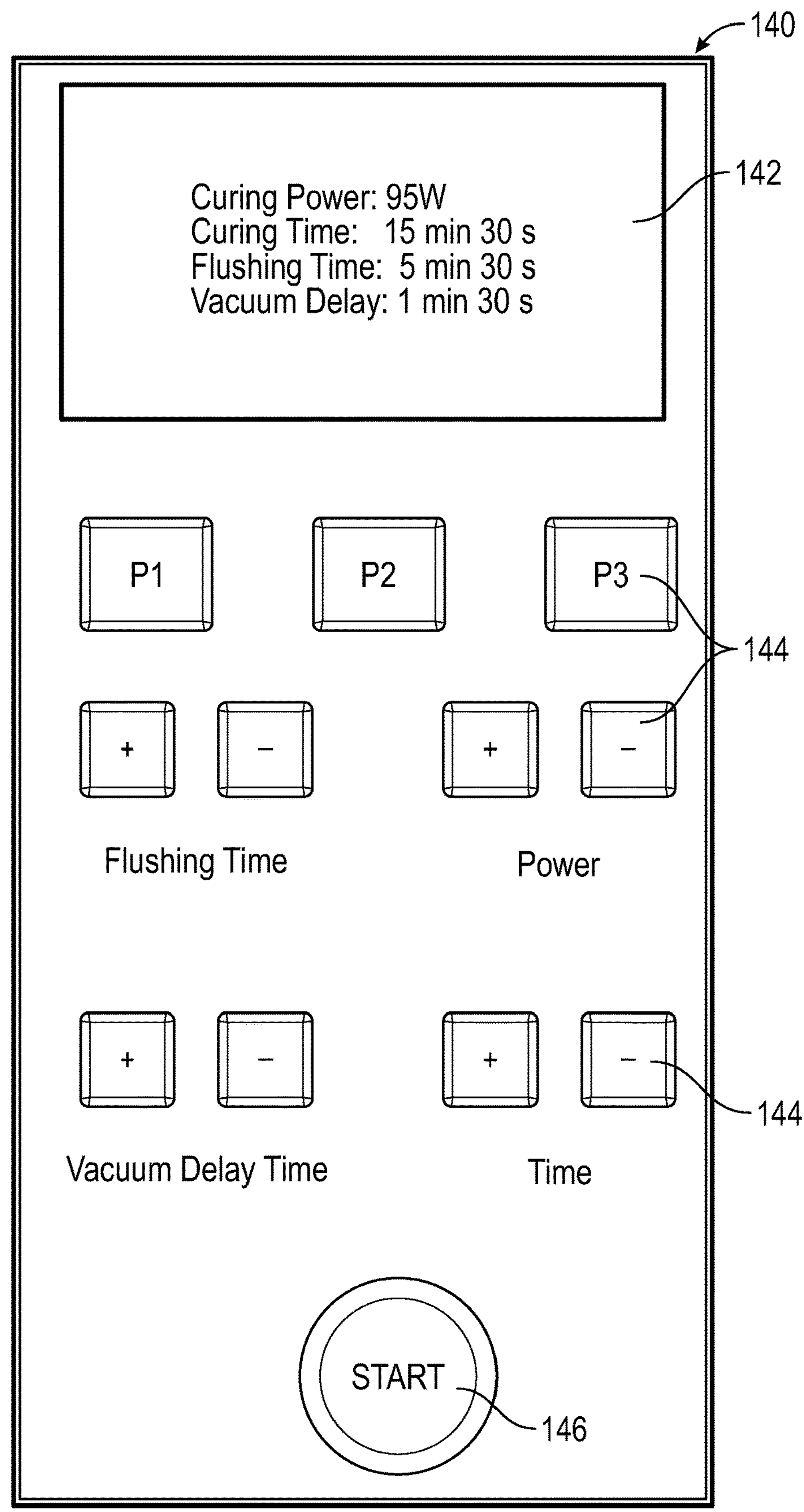
FIG. 1E is a generalized schematic diagram of an exemplary user interface.

Referring to FIG. 1E, an exemplary user interface 140 is shown. The user interface 140 has a display 142 and numerous program switches 144 comprising at least one button, at least one dial (e.g., in FIG. 1B), or a combination thereof. The embodiment shown in FIG. 1E includes eleven buttons 144. Any number of buttons 144 (or dials) can be dedicated to either raising or lowering selected values of parameters such as gas flushing time, light intensity (e.g., power), vacuum delay time, and/or time of light emission. Often, the user interface comprises a start button 146, which may be configured (e.g., electronically coupled to the LEDs) such that pressing the start button initiates light emitted by the LEDs. Optionally, the start button 146 is configured (e.g., electronically coupled to the program switches 144) to initiate a program that has been entered via the user interface. In some embodiments, the user interface 140 comprises a touch screen 143 that provides the display and the plurality of program switches (e.g., in FIG. 1C). In other embodiments, the display 142 is not a touch screen. Advantageously, in some embodiments the program switches 144 are further configured to adjust a time of flushing the chamber 120 with a gas from the gas source 160, pressure of flushing the chamber 120 with the gas, or both.

Referring again to FIG. 1B, in some embodiments the apparatus 1000 further comprises a processor 170. The processor 170 causes the (e.g., at least two) LEDs 130 to emit light and the vacuum pump 150 to operate according to a program inputted through the user interface 140. Any suitable computer processor could be incorporated into the apparatus. In select embodiments, the processor 170 further comprises a memory 172, which provides the capability of causing the LEDs 130 to emit light and/or the vacuum pump 150 to operate according to a program that is stored in the memory 172. The processor 170 is electronically coupled to the user interface 140, either wirelessly or physically via electrical connections. An advantage of including a memory is that the device would have the capability of logging a program that has been run and optionally reporting out details of a post-cure program for a particular article, especially for an article that requires regulatory approval.

In some embodiments, operational parameters of the apparatus that are adjustable by the user interface comprise 1) light intensity provided by the LEDs, 2) length of time of light provided by the LEDs, and 3) delay time between initiation of light provided by the LEDs and initiation of vacuum pulled on an interior of the chamber by the vacuum pump. In some embodiments, operational parameters of the apparatus that are adjustable by the user interface comprise 1) light intensity provided by the LEDs, 2) length of time of light provided by the LEDs, and 3) delay time between initiation of vacuum pulled on an interior of the chamber by the vacuum pump and initiation of light provided by the LEDs. Hence, a user has options for the order and timing of performing post-cure steps and can customize a post-cure treatment for a particular sample by selecting variations of these operational parameters.

Suitable lengths of time for light to be provided by the LEDs comprise 1 minute or greater, 2 minutes or greater, 3 minutes or greater, 4 minutes or greater, 5 minutes or greater, 6 minutes or greater, 7 minutes or greater, 8 minutes or greater, 9 minutes or greater, 10 minutes or greater, 11 minutes or greater, 13 minutes or greater, 15 minutes or greater, 16 minutes or greater, 18 minutes or greater, or 20 minutes or greater; and 180 minutes or less, 150 minutes or less, 125 minutes or less, 100 minutes or less, 80 minutes or less, 60 minutes or less, 40 minutes or less, 30 minutes or less, 25 minutes or less, or 21 minutes or less, 18 minutes or less, 16 minutes or less, or 12 minutes or less, such as 7 minutes to 25 minutes.

Suitable times between initiation of light provided by the LEDs and initiation of vacuum pulled on an interior of the chamber by the vacuum pump comprise 5 seconds or greater, 7 seconds or greater, 10 seconds or greater, 12 seconds or greater, 15 seconds or greater, 25 seconds or greater, 30 seconds or greater, 40 seconds or greater, 50 seconds or greater, 60 seconds or greater, or 70 seconds or greater; and 15 minutes or less, 13 minutes or less, 11 minutes or less, 9 minutes or less, 7 minutes or less, 5 minutes or less, 3 minutes or less, 2 minutes or less, or 1 minute or less, such as 10 seconds to 3 minutes.

Suitable times between initiation of vacuum pulled on an interior of the chamber by the vacuum pump and initiation of light provided by the LEDs comprise 5 seconds or greater, 7 seconds or greater, 10 seconds or greater, 12 seconds or greater, 15 seconds or greater, 25 seconds or greater, 30 seconds or greater, 40 seconds or greater, 50 seconds or greater, 60 seconds or greater, or 70 seconds or greater; and 5 minutes or less, 4.5 minutes or less, 4 minutes or less, 3.5 minutes or less, 3 minutes or less, 2.5 minutes or less, 2 minutes or less, 1.5 minutes or less, 1 minute or less, 50 seconds or less, 40 seconds or less, or 30 seconds or less, such as 5 seconds to 40 seconds.

Articles and Systems

In a second aspect, an article is provided. An article comprises a plurality of layers of at least one photopolymerized crosslinked composition, the article comprising 0.1% by weight or less of extractable components, based on the total weight of the article, when extracted with 5 volume percent ethanol in water, the article made by a process comprising:

a) obtaining a photopolymerizable composition;
b) selectively curing the photopolymerizable composition using actinic radiation to form an article comprising a plurality of layers of at least one photopolymerized composition;
c) removing excess photopolymerizable composition from the article;
d) placing the article in the apparatus according to the first aspect;
e) inputting a post-cure program or accessing a saved post-cure program through the user interface, the post-cure program comprising 1) light intensity provided by the at least two LEDs, 2) length of time of light provided by the at least two LEDs, and at least one of: 3a) delay time between initiation of light provided by the at least two LEDs and initiation of vacuum pulled by the vacuum pump or 3b) delay time between initiation of vacuum pulled on an interior of the chamber by the vacuum pump and initiation of light provided by the at least two LEDs; and f) running the post-cure program.

Figure 4:
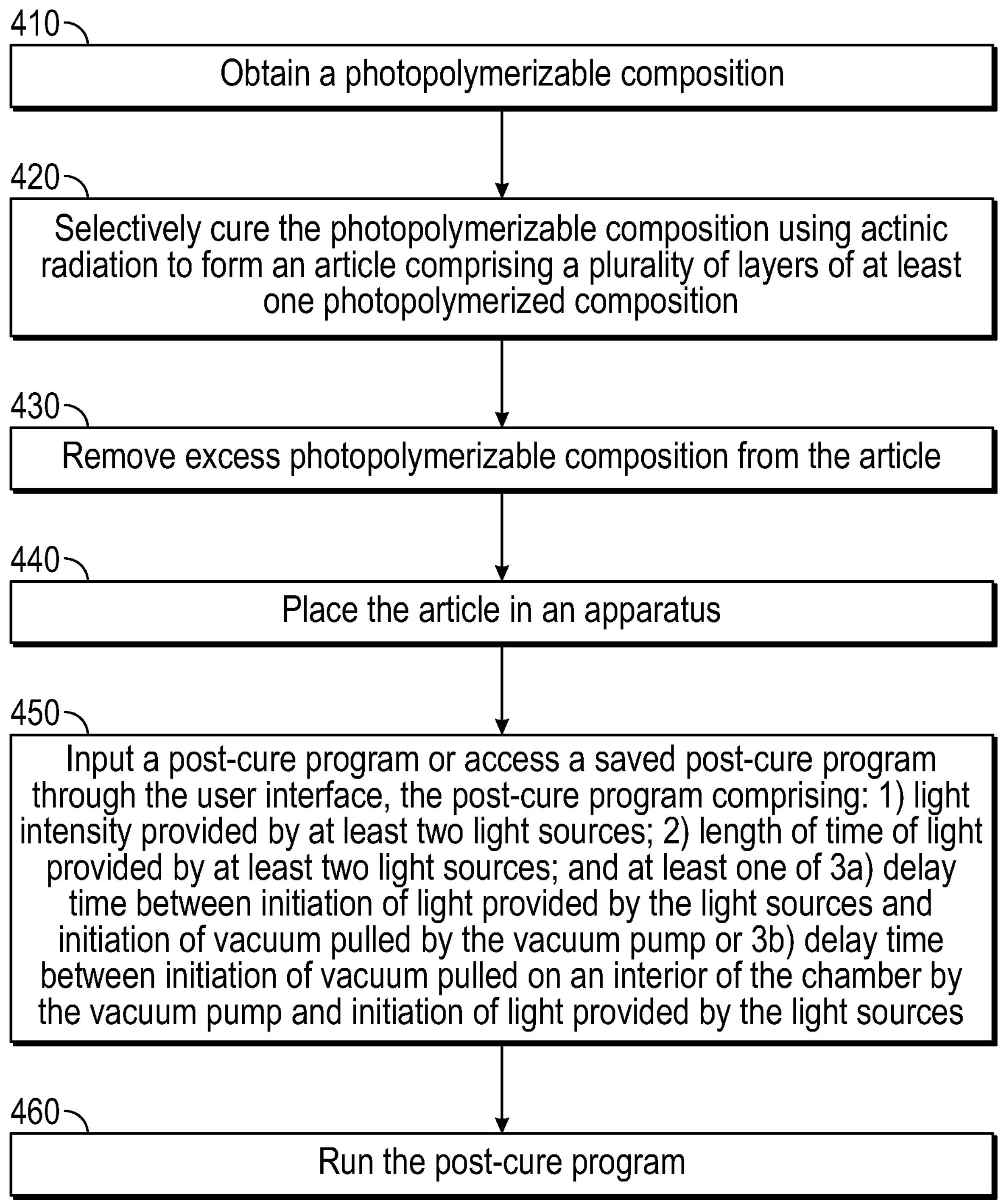
FIG. 4 is a flowchart of an exemplary process for making an article.

Referring to FIG. 4, the article may be made by a process including obtaining a photopolymerizable composition 410; selectively curing the photopolymerizable composition using actinic radiation to form an article comprising a plurality of layers of at least one photopolymerized composition 420; and removing excess photopolymerizable composition from the article 430. Next, the article is placed in an apparatus (e.g., as described above in detail with respect to the first aspect) 440, followed by inputting a post-cure program or accessing a saved post-cure program through the user interface 450 and running the post-cure program 460. The post-cure program comprises 1) light intensity provided by at least two light sources (e.g., LEDs); 2) length of time of light provided by at least two light sources; and at least one of 3a) delay time between initiation of light provided by the light sources and initiation of vacuum pulled by the vacuum pump or 3b) delay time between initiation of vacuum pulled on an interior of the chamber by the vacuum pump and initiation of light provided by the light sources. Suitable light intensities and times are as described above with respect to the apparatuses.

In an embodiment, the post-cure program comprises turning on a first light source for a predetermined amount of time, followed by turning on a second light source for a predetermined amount of time, wherein the amounts of time may be the same or different. The first light source and the second light source can be employed for either some or no overlapping time. Optionally, the first light source may provide a different light wavelength (or range of wavelengths) and/or intensity than the second light source.

In some embodiments, the post-cure program is inputted through the user interface shortly before running that post-cure program. In some embodiments, the post-cure program is saved in a memory of a processor, either due to being pre-installed by the apparatus manufacturer or entered and saved by a user. To save a program, after each operational parameter has been chosen for the program, a user can activate (e.g., press and hold a program switch such as any one of P1, P2, or P3 buttons 144 shown in FIG. 1E) for up to several seconds for the inputted program to be saved to that program switch. When a saved program is subsequently being accessed, a user may simply select the program by activating a program switch (e.g., pressing a button, turning a dial, touching a touch sensor display in a certain place, etc.) to which the program is saved.

In some embodiments, following the post-cure program, the article contains 0.1% by weight or less of extractable components, based on the total weight of the article, when extracted with 5 volume percent ethanol in water, 0.9% by weight or less, 0.8% by weight or less, 0.7% by weight or less, 0.6% by weight or less, 0.5% by weight or less, or 0.4% by weight or less of extractable components; and 0.01% by weight or more, 0.03% by weight or more, 0.05% by weight or more, 0.07% by weight or more, or 0.1% by weight or more of extractable components, based on the total weight of the article, when extracted with 5 volume percent ethanol in water. A suitable test procedure for determining the amount of extractable components includes placing an article having a total surface area of 45 $cm^2$ in a 40 milliliter (mL) glass vial and weighing the vial. 15 mL of solvent (5 volume % ethanol/Milli-Q water) is added to the vial, with one 15 mL blank (vial containing solvent but without articles). The vials are covered with TEFLON caps and the samples are kept at 37° C. for 24 hours while shaking at 80 revolutions per minute (RPM) in a shaker (e.g., a LabLine Benchtop incubated shaker, Model No. 4628). The samples are allowed to cool before transferring the extraction solution to a new 20 mL glass vial. A 5 mL aliquot is transferred to a pre-weighed 8 mL glass vial and set to evaporate under a nitrogen purge. The vials are then weighed once the solvent evaporates, until a constant weight is reached. % Residue is calculated using the formula below. The test is typically completed in triplicates, all run at the same time, with the result being the average of the replicates.

$$\% \text{ Residue} = \left[\frac{(\text{vial after evaporation (g)} - \text{vial tare (g)}) * (15 \text{ mL solvent})}{(\text{mass of article (g)}) * (5 \text{ mL solvent analyzed})}\right] * 100$$

Various photopolymerizable compositions are suitable for use in the methods according to the present disclosure. The compositions include at least one polymerizable component. The term "component" encompasses compounds, monomers, oligomers, and polymers. A "polymerizable component," for reference purposes herein, comprises a hardenable component that can be cured to provide a printed article. In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used.

In any embodiment, the photopolymerizable composition includes at least one of a (meth)acryl component, an epoxy component, a polyalkylene component, a polyalkylene oxide component, a polyester component, a polycarbonate component, a urethane component, a polyamide component, a thiol component and an ene component that is different from the (meth)acryl component, or combinations thereof. In some embodiments, a photopolymerizable composition includes a (meth)acryl component in combination with one or more of an epoxy component, a polyalkylene component, a polyalkylene oxide component, a polyester component, a polycarbonate component, a urethane component, and/or a polyamide component.

Suitable photopolymerizable compositions include for instance and without limitation, the compositions described in detail in the following co-owned applications: International Application No. PCT/IB2019/059351 (Klun et al.); International Application Nos. PCT/IB2019/055413 (Wu et al.), PCT/IB2019/055455 (Klun et al.), PCT/US2019/033252 (Klun et al.), and PCT/IB2019/051815 (Abuelyaman et al.); and published applications WO 2019/103855 (Parkar et al.)), WO 2019/023009 (Parkar et al.)), WO 2019/104072 (Chakraborty et al.), WO 2019/104079 (Chakraborty et al.), WO 2018/119026 (Parkar et al.), US 2008/0248442 (Cinader et al.), WO 2016/191538, WO 2016/191162 (Mayr et al), WO 2018/231583 (Herrmann et al.), and WO 2018/038954 (Raia et al.). These applications are incorporated herein by reference in their entireties. Suitable articles that may be made using photopolymerizable compositions include for instance and without limitation, dental articles, such as to crowns, bridges, veneers, inlays, onlays, fillings, and prostheses (e.g., partial or full dentures); and orthodontic appliances and devices such as orthodontic brackets, buccal tubes, lingual retainers, orthodontic bands, class II and class III correctors, sleep apnea devices, bite openers, buttons, cleats, and other attachment devices. In select embodiments, the article is an orthodontic article or a dental restoration.

In certain embodiments, the photopolymerized composition comprises a (meth)acryl polymer and at least one ceramic material, a urethane (meth)acryl polymer, a polyalkylene oxide (meth)acryl polymer, a polyalkylene oxide urethane (meth)acryl polymer, a polyester urethane (meth) acryl polymer, a polycarbonate urethane (meth)acryl polymer, a polyamide polymer, an epoxy (meth)acrylate polymer, a thioether polymer, or any combination thereof. In an embodiment, the photopolymerized composition comprises a (meth)acryl polymer and at least one ceramic material. In an embodiment, photopolymerized composition comprises a polycarbonate urethane (meth)acryl polymer. As used herein, the term "(meth)acrylate" is a shorthand reference to acrylate, methacrylate, or combinations thereof, "(meth) acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl groups, and linked by an aliphatic segment if containing two or more groups. As used herein, "(meth) acrylate-functional compounds" are compounds that include, among other things, a (meth)acrylate moiety.

In some embodiments, the photopolymerizable composition contains ceramic particles as a ceramic material. As used herein, "ceramic particle" includes particles of amorphous material, glass, crystalline ceramic, glass-ceramic, and combinations thereof, and refers to non-metallic materials produced by application of heat or made by a chemical synthesis process. Ceramic particles are usually classified as inorganic materials. The term "amorphous material" with respect to ceramic particles refers to a material derived from a melt and/or a vapor phase as well as a material made from chemical synthesis, wherein the material lacks long range crystal structure as determined by X-ray diffraction and/or has an exothermic peak corresponding to the crystallization of the amorphous material as determined by DTA (differential thermal analysis). For instance, amorphous silica nanoparticles may be generated by condensation of silanes to form the nanoparticles.

In many embodiments, the optional ceramic particles comprise metal oxide ceramic particles, non-oxide ceramic particles, or any combination thereof.

Preferably, the ceramic particles are selected from the group consisting of zirconia ($ZrO_2$), silica ($SiO_2$), alumina ($Al_2O_3$), yttria ($Y_2O_3$), ceria ($CeO_2$), magnesium-magnesia aluminate (MMA), magnesium oxide (MgO), hydroxyapatite ($Ca_5(PO_4)_3OH$), fluorapatite ($Ca_5(PO_4)_3F$), chlorapatite ($Ca_5(PO_4)_3Cl$), calcite ($CaCO_3$), cordierite ($Mg_2Al_4Si_5O_{18}$), silicon carbide (SiC), silicon nitride ($Si_3N_4$), boron carbide ($B_4C$), titanium diboride ($TiB_2$), zirconium diboride ($ZrB_2$), boron nitride (BN), titanium carbide (TiC), zirconium carbide (ZrC), aluminium nitride (AlN), calcium hexaboride ($CaB_6$), MAX phase ($M_{n+1}AX_{11}$), and any combination thereof. In select embodiments, high-purity particles are used, in which the total content of metal impurities is preferably less than 100 ppm, particularly preferably less than 50 ppm. In alternate embodiments, particles are used having a total content of metal impurities of about 2,000 ppm. Suitable ceramic particles are described in detail in co-owned Application No.

In some embodiments, the photopolymerizable composition, which may be a slurry or sol, comprises 20 wt. % or greater ceramic particles, based on the total weight of the photopolymerizable composition, 21 wt. % or greater, 22 wt. %, 23 wt. %, 24 wt. %, 25 wt. %, 26 wt. %, 27 wt. %, 28 wt. %, 29 wt. %, 30 wt. %, 32 wt. % or 35 wt. % or greater; and 60 wt. % or less, 29.5 wt. % or less, 28.5 wt. % or less, 27.5 wt. % or less, 26.5 wt. % or less, 25.5 wt. % or less, or 24.5 wt. % or less ceramic particles, based on the total weight of the photopolymerizable composition. In some embodiments, the photopolymerizable composition (e.g., slurry or sol) comprises 3 volume percent (vol. %) or greater ceramic particles, based on the total volume of the photopolymerizable composition, 4 vol. %, 5 vol. %, 6 vol. %, 7 vol. %, 8 vol. %, 9 vol. %, 10 vol. %, 11 vol. %, 12 vol. %, 13 vol. %, 14 vol. %, 15 vol. %, 17 vol. %, 19 vol. %, 21 vol. %, 23 vol. %, 25 vol. % or 29 vol. % or greater; and 45 vol. % or less, 44 vol. %, 42 vol. %, 40 vol. %, 38 vol. %, 36 vol. %, 34 vol. %, 32 vol. %, or 30 vol. % or less ceramic particles, based on the total volume of the photopolymerizable composition.

As used herein, "sol" refers to a continuous liquid phase containing discrete particles having sizes in a range from 1 nanometer (nm) to 100 nm. "Slurry" refers to a continuous liquid phase containing discrete particles having sizes in a range from greater than 100 nm to 50 micrometers or from greater than 100 nm to 10 micrometers. A slurry may optionally further contain discrete particles having sizes in a range from 1 nanometer (nm) to 100 nm. As used herein, a "particle" refers to a substance being a solid having a shape which can be geometrically determined. The shape can be regular or irregular. Particles can typically be analyzed with respect to e.g., particle size and particle size distribution. A particle can comprise one or more crystallites. Thus, a particle can comprise one or more crystal phases.

The ceramic particles typically comprise an average (mean) particle size diameter (i.e., $D_{50}$) of 1 nanometer (nm) or greater, 3 nm, 4 nm, 5 nm, 6 nm, 7 nm, 8 nm, 9 nm, 10 nm, 12 nm, 15 nm, 17 nm, 20 nm, 25 nm, 30 nm, 40 nm, 50 nm, 60 nm, 75 nm, 90 nm, 100 nm, 125 nm, 150 nm, 175 nm, 200 nm, 225 nm, 250 nm, 350 nm, 500 nm, 750 nm, 1 micrometer, 1.25 micrometers, 1.5 micrometers, 1.75 micrometers, 2 micrometers, 2.5 micrometers, 3.0 micrometers, 3.5 micrometers, 4.0 micrometers, or 4.5 micrometers or greater; and a $D_{50}$ of 10 micrometers or less, 9.5 micrometers, 9 micrometers, 8.5 micrometers, 8 micrometers, 7.5 micrometers, 7 micrometers, 6.5 micrometers, 6 micrometers, 5.5 micrometers, 5 micrometers, 4.5 micrometers, 3 micrometers, 2 micrometers, 1.5 micrometers, 1 micrometer, 900 nm, 800 nm, 700 nm, 600 nm, 500 nm, 400 nm, 300 nm, or 250 nm or less. The average (mean) particle size ($D_{50}$) refers to that particle diameter at which 50 percent by volume of the particles in a distribution of particles have that diameter or a smaller diameter, as measured by scanning electron microscopy or transmission electron microscopy. Preferably, the average particle size is of the primary particles.

Photopolymerizable compositions of the present disclosure typically include at least one photoinitiator. Suitable exemplary photoinitiators are those available under the trade designations OMNIRAD from IGM Resins (Waalwijk, The Netherlands) and include 1-hydroxycyclohexyl phenyl ketone (OMNIRAD 184), 2,2-dimethoxy-1,2-diphenylethan-1-one (OMNIRAD 651), bis(2,4,6 trimethylbenzoyl) phenylphosphineoxide (OMNIRAD 819), 1-[4-(2-hydroxyethoxy)phenyl]-2-hydroxy-2-methyl-1-propane-1-one (OMNIRAD 2959), 2-benzyl-2-dimethylamino-1-(4-morpholinophenyl)butanone (OMNIRAD 369), 2-Dimethylamino-2-(4-methyl-benzyl)-1-(4-morpholin-4-yl-phenyl)-butan-1-one (OMNIRAD 379), 2-methyl-1-[4-(methylthio) phenyl]-2-morpholinopropan-1-one (OMNIRAD 907), Oligo[2-hydroxy-2-methyl-1-[4-(1-methylvinyl)phenyl]

propanone] ESACURE ONE (Lamberti S.p.A., Gallarate, Italy), 2-hydroxy-2-methyl-1-phenyl propan-1-one (DAROCUR 1173), 2, 4, 6-trimethylbenzoyldiphenylphosphine oxide (OMNIRAD TPO), and 2, 4, 6-trimethylbenzoylphenyl phosphinate (OMNIRAD TPO-L). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof. In some embodiments, a cationic photoinitiator is present in compositions that include epoxy component, for example. Further, a thermal initiator can optionally be present in a photopolymerizable composition described herein. For instance, a free-radical photoinitiator, a cationic photoinitiator, a thermal photoinitiator, or any combination thereof may be present in a photopolymerizable composition.

Suitable cationic photoinitiators include for instance and without limitation, bis[4-diphenylsulfoniumphenyl]sulfide bishexafluoroantimonate; thiophenoxyphenylsulfonium hexafluoroantimonate (available as CHIVACURE 1176 from Chitec (Houston, TX), tris(4-(4-acetylphenyl)thiophenyl)sulfonium tetrakis(pentafluorophenyl)borate, tris(4-(4-acetylphenyl)thiophenyl)sulfonium tris[trifluoromethyl) sulfonyl]methide, and tris(4-(4-acetylphenyl)thiophenyl) sulfonium hexafluorophosphate, [4-(1-methylethyl)phenyl] (4-methylphenyl) iodonium tetrakis(pentafluorophenyl) borate, 4-[4-(2-chlorobenzoyl)phenylthio]phenylbis(4-fluorophenyl)sulfonium hexafluoroantimonate, and aromatic sulfonium salts with anions of $(PF_{6-m}(C_nF_{2n+1})_m)^-$ where m is an integer from 1 to 5, and n is an integer from 1 to 4 (available as CPI-200K or CPI-200S, which are monovalent sulfonium salts from San-Apro Ltd., (Kyoto, JP) TK-1 available from San-Apro Ltd., or HS-1 available from San-Apro Ltd.)

In some embodiments, a photoinitiator is present in a photopolymerizable composition in an amount of up to about 5% by weight, based on the total weight of polymerizable components in the photopolymerizable composition (e.g., not including components such as ceramic particles). In some cases, a photoinitiator is present in an amount of about 0.1-5% by weight, 0.2-5% by weight, or 0.5-5% by weight, based on the total weight of the photopolymerizable composition.

In some embodiments, a thermal initiator is present in a photopolymerizable composition or in an amount of up to about 5% by weight, based on the total weight of polymerizable components in the photopolymerizable composition. In some cases, a thermal initiator is present in an amount of about 0.1-5% by weight, based on the total weight of polymerizable components in the photopolymerizable composition. Suitable thermal initiators include for instance and without limitation, peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, DE) under the VAZO trade designation including VAZO 67 (2,2'-azo-bis (2-methybutyronitrile)) VAZO 64 (2,2'-azo-bis(isobutyronitrile)) and VAZO 52 (2,2'-azo-bis(2,2-dimethyvaleronitrile)), and LUCIDOL 70 from Elf Atochem North America, Philadelphia, PA.

In some embodiments of compositions including free-radically polymerizable components, the composition contains a first free-radical photoinitiator having sufficient absorbance at a first wavelength range; and a second free-radical initiator selected from a second photoinitiator having sufficient absorbance at a second wavelength range, wherein the second wavelength range is different than the first wavelength range, or a thermal free-radical initiator. Some suitable first free-radical photoinitiators include for instance and without limitation, acyl phosphine oxide and alkyl amine acetophenone. Some suitable second free-radical photoinitiators include for instance and without limitation, photoinitiators comprising photoinitiator groups selected from benzil ketal or hydroxy-acetophenone. Suitable thermal free-radical initiators may include a peroxide or azo group. Additional details regarding such combinations of a first free-radical photoinitiator with either a thermal free-radical initiator or a second free-radical photoinitiator are described in co-owned International Application No. PCT/US2018/062085 (Chakraborty et al.).

In some embodiments of compositions including free-radically polymerizable components, the composition contains a polymer or macromolecule comprising a free-radical photoinitiator group, for instance including a polymer or macromolecule backbone and pendent photoinitiator groups. Suitable photoinitiator groups include for instance and without limitation, a hydroxy or alkyl amino acetophenone photoinitiator. Additional details regarding such polymers and macromolecules comprising a free-radical photoinitiator group are described in co-owned International Application No. PCT/US2018/062074 (Chakraborty et al.).

In certain aspects, the use of more than one initiator assists in increasing the percentage of monomer that gets incorporated into the reaction product of polymerizable components and thus decreasing the percentage of the monomer that remains uncured.

Data representing an article may be generated using computer modeling such as computer aided design (CAD) data. Image data representing the (e.g., polymeric) article design can be exported in STL format, or in any other suitable computer processable format, to the additive manufacturing equipment. Scanning methods to scan a three-dimensional object may also be employed to create the data representing the article. One exemplary technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article). In select embodiments, scanning techniques may include, for example, scanning a patient's mouth to customize an orthodontic article for the patient.

Figure 10:
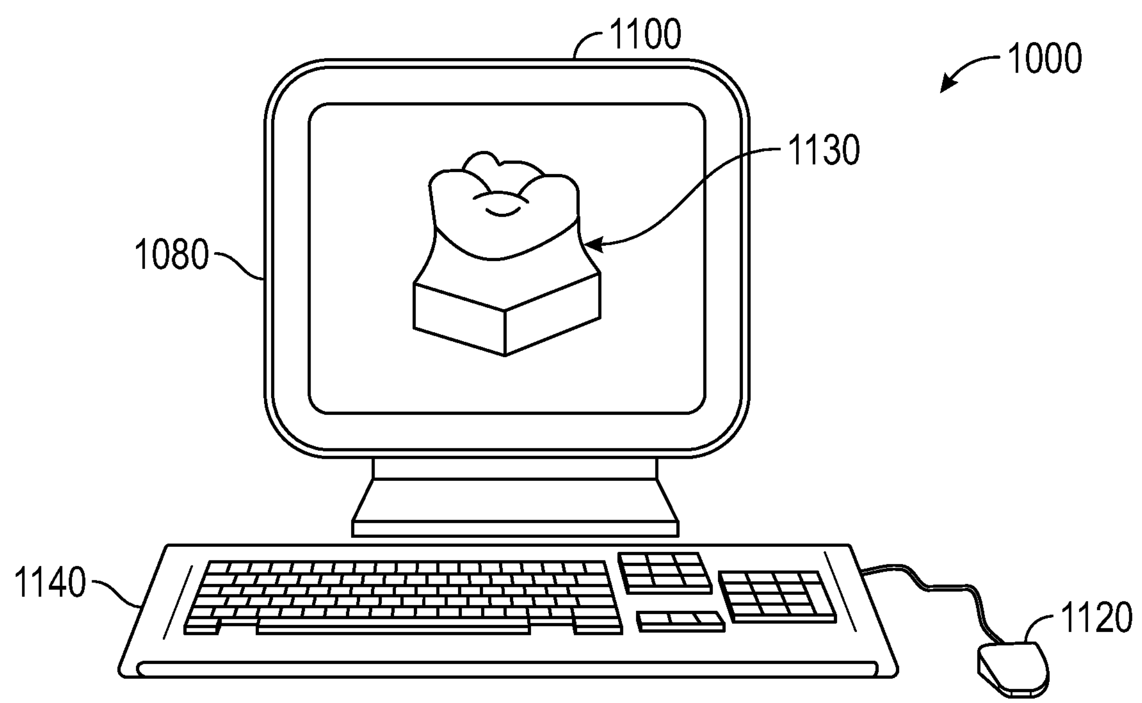
FIG. 10 is a schematic front view of an exemplary computing device 1000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 10, a computing device 1000 often includes an internal processor 1080, a display 1100 (e.g., a monitor), and one or more input devices such as a keyboard 1140 and a mouse 1120. In FIG. 10, a dental crown 1130 is shown on the display 1100.

Figure 6:
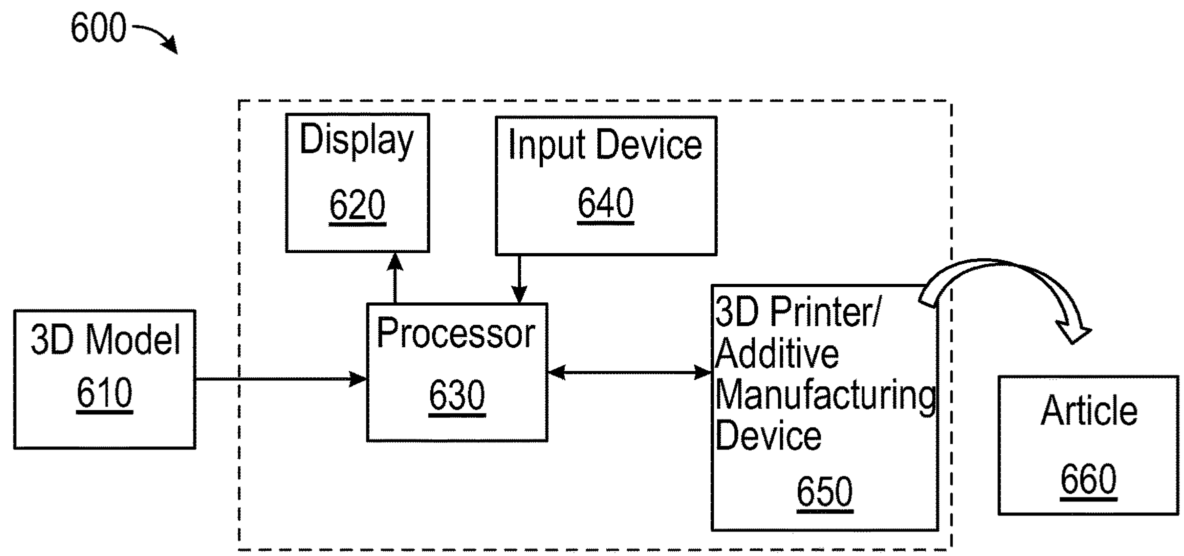
FIG. 6 is a block diagram of a generalized system 600 for additive manufacturing of an article.

Referring to FIG. 6, a system 600 is provided, which may be used to form the article. The system 600 comprises a display 620 that displays a 3D model 610 of an article (e.g., a dental crown 1130 as shown on the display 1100 of FIG. 10); and one or more processors 630 that, in response to the 3D model 610 selected by a user, cause a 3D printer/additive manufacturing device 650 to create a physical object of the article 660. Often, an input device 640 (e.g., keyboard and/or mouse) is employed with the display 620 and the at least one processor 630, particularly for the user to select the 3D model 610.

Figure 7:
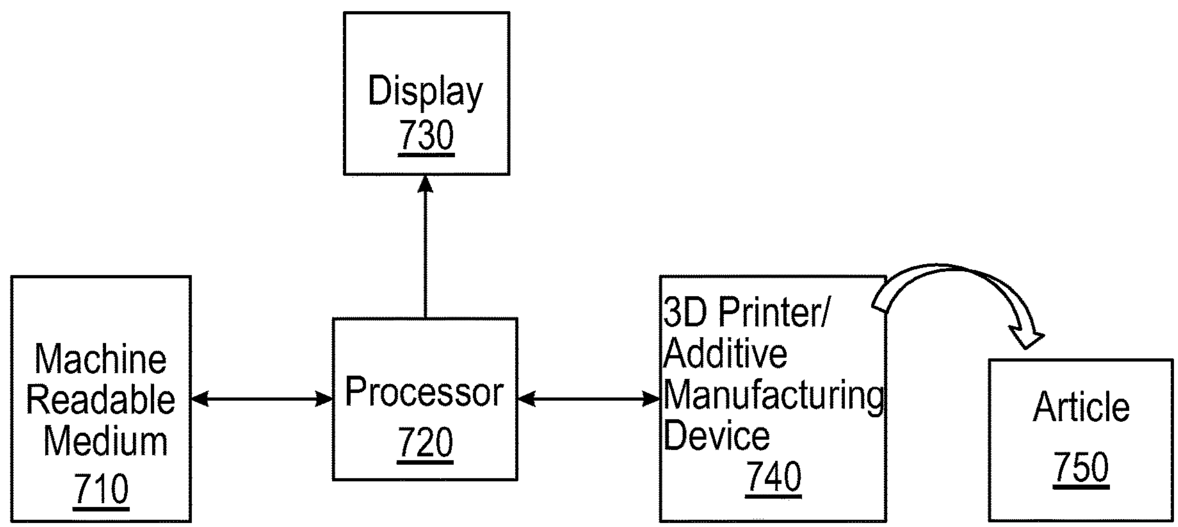
FIG. 7 is a block diagram of a generalized manufacturing process for an article.

Referring to FIG. 7, a processor 720 (or more than one processor) is in communication with each of a machine-readable medium 710 (e.g., a non-transitory medium), a 3D printer/additive manufacturing device 740, and optionally a display 730 for viewing by a user. The 3D printer/additive manufacturing device 740 is configured to make one or more articles 750 based on instructions from the processor 720 providing data representing a 3D model of the article 750 (e.g., an aligner article 1130 as shown on the display 1100 of FIG. 10) from the machine-readable medium 710.

Figure 8:
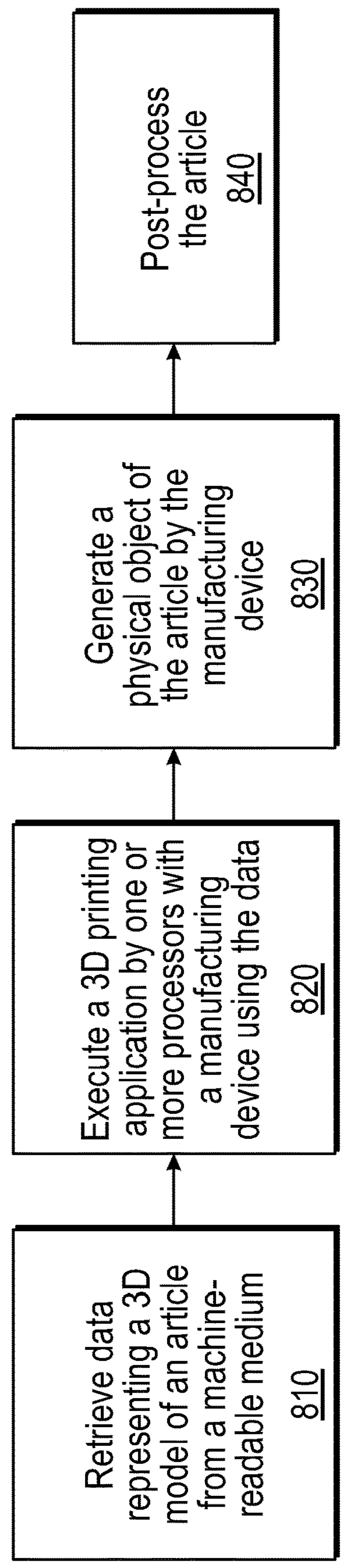
FIG. 8 is a high-level flow chart of an exemplary article manufacturing process.

Referring to FIG. 8, for example and without limitation, an additive manufacturing method comprises retrieving 810, from a (e.g., non-transitory) machine-readable medium, data representing a 3D model of an article according to at least one embodiment of the present disclosure. The method further includes executing 820, by one or more processors, an additive manufacturing application interfacing with a manufacturing device using the data; and generating 830, by the manufacturing device, a physical object of the article. For example, the additive manufacturing equipment can selectively cure a photopolymerizable composition to form an article having a plurality of layers. One or more various optional post-processing steps 840 may be undertaken. Typically, remaining unpolymerized photopolymerizable component may be cured, such as in an apparatus according to the first aspect.

Figure 9:
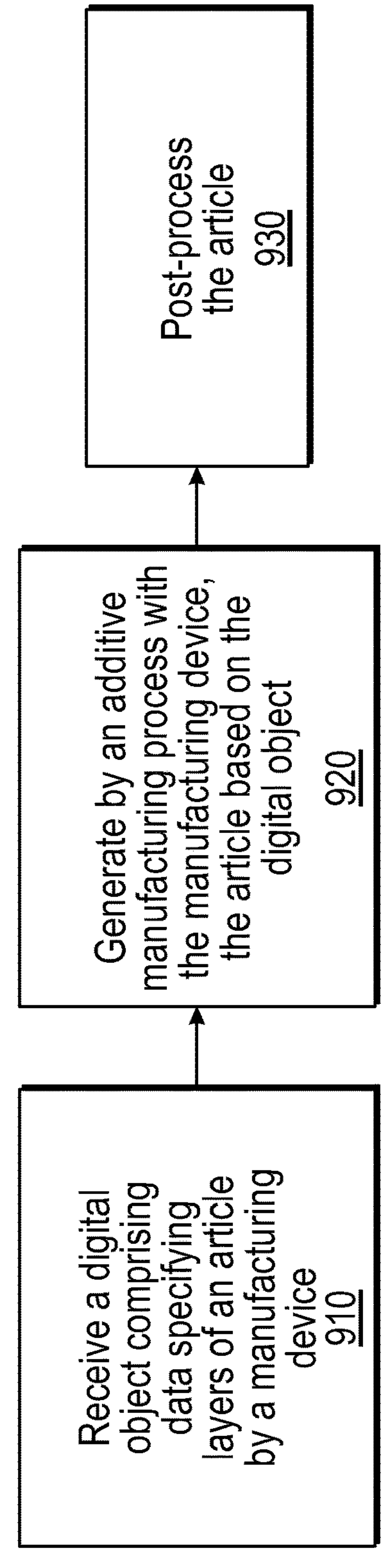
FIG. 9 is a high-level flow chart of an exemplary article additive manufacturing process.

Additionally, referring to FIG. 9, a method of making an article comprises receiving 910, by a manufacturing device having one or more processors, a digital object comprising data specifying a plurality of layers of an article; and generating 920, with the manufacturing device by an additive manufacturing process, the article based on the digital object. Again, the article may undergo one or more steps of post-processing 930.

Figure 2:
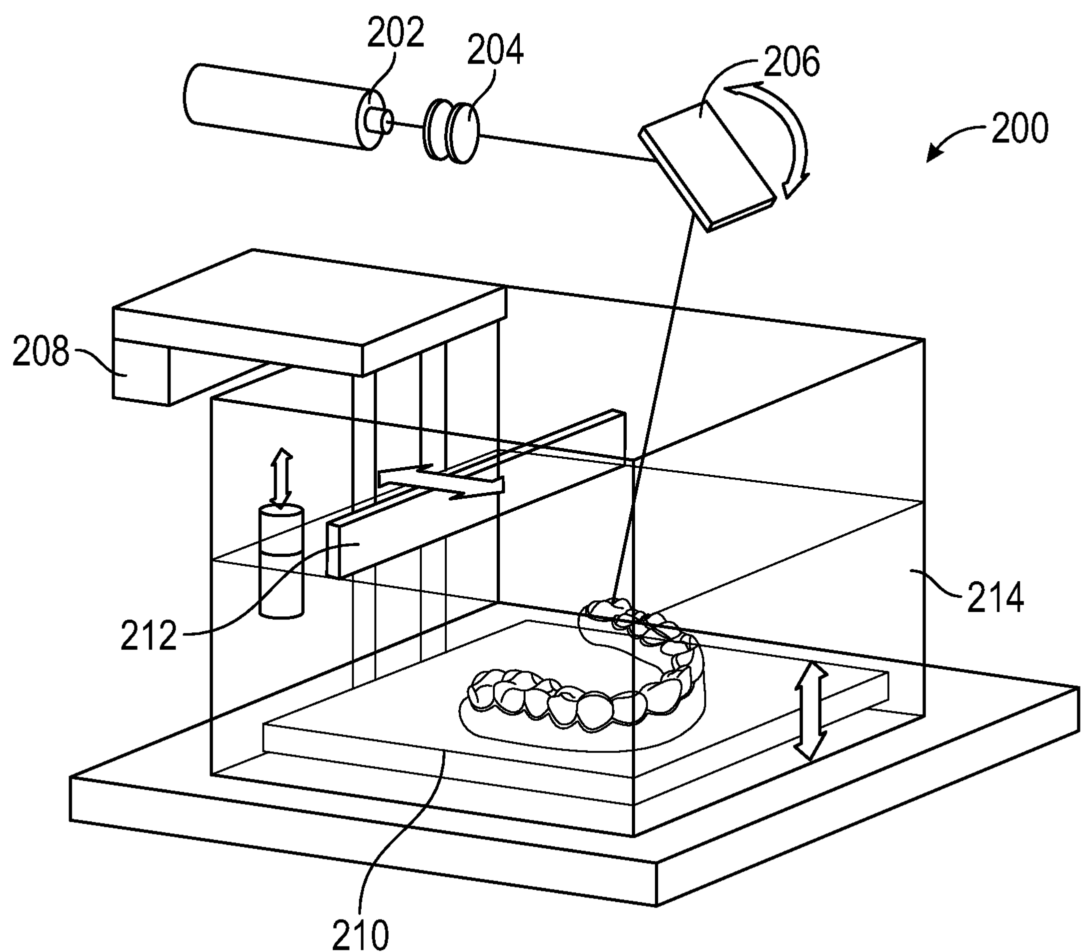
FIG. 2 is a generalized schematic of a stereolithography apparatus.
Figure 3:
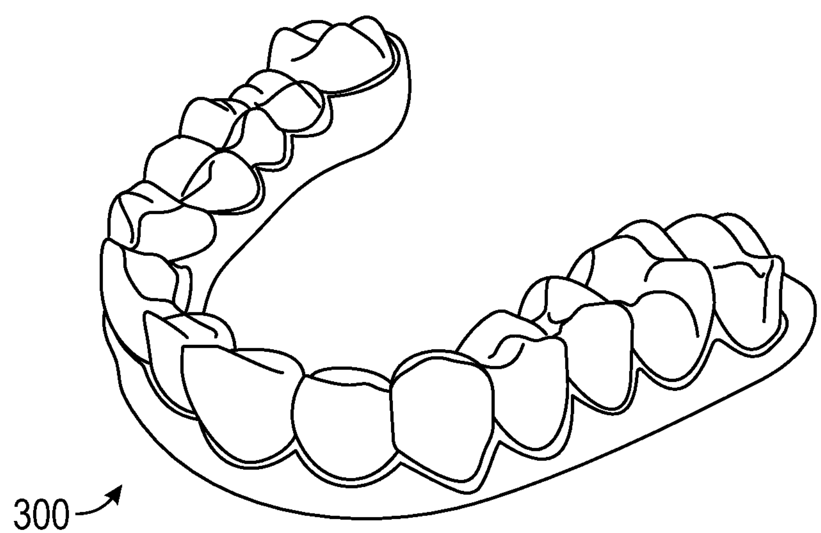
FIG. 3 is an isometric view of an exemplary article.

FIG. 2 shows an exemplary stereolithography apparatus ("SLA") that may be used with photopolymerizable compositions and methods described herein. In general, the SLA 200 may include a laser 202, optics 204, a steering lens 206, an elevator 208, a platform 210, and a straight edge 212, within a vat 214 filled with the photopolymerizable composition. In operation, the laser 202 is steered across a surface of the photopolymerizable composition to cure a cross-section of the photopolymerizable composition, after which the elevator 208 slightly lowers the platform 210 and another cross section is cured. The straight edge 212 may sweep the surface of the cured composition between layers to smooth and normalize the surface prior to addition of a new layer. In other embodiments, the vat 214 may be slowly filled with liquid resin while an article is drawn, layer by layer, onto the top surface of the photopolymerizable composition.

A related technology, vat polymerization with Digital Light Processing ("DLP"), also employs a container of curable polymer (e.g., photopolymerizable composition). However, in a DLP based system, a two-dimensional cross section is projected onto the curable material to cure the desired section of an entire plane transverse to the projected beam at one time. All such curable polymer systems as may be adapted to use with the photopolymerizable compositions described herein are intended to fall within the scope of the term "vat polymerization system" as used herein. In certain embodiments, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.).

More generally, the photopolymerizable composition is typically cured using actinic radiation, such as UV radiation, e-beam radiation, visible radiation, or any combination thereof. The skilled practitioner can select a suitable radiation source and range of wavelengths for a particular application without undue experimentation.

After the 3D article has been formed, it is typically removed from the additive manufacturing apparatus and rinsed, (e.g., an ultrasonic, or bubbling, or spray rinse in a solvent, which would dissolve a portion of the uncured photopolymerizable composition but not the cured, solid state article (e.g., green body). Any other conventional method for cleaning the article and removing uncured material at the article surface may also be utilized. In some embodiments, removing uncured material at the article surface comprises moving the article and thereby generating a mass inertial force in uncured photopolymerizable composition disposed on the article, thus forming a coating layer of uncured photopolymerizable composition on the article. The mass inertial force can be generated using a centrifuge, a shaker, or a mixer that spins along one or more axes. Suitable ways of generating a mass inertial force are described, for instance, in co-owned International Application No. PCT/IB2020050451 (Chakraborty et al.), incorporated herein by reference in its entirety. For instance, the source of the mass inertial force may be generated using a centrifuge, a shaker, or a mixer that spins along one or more axes. In some embodiments, the moving of the object is a rotation or spinning of the object. Accordingly, the mass inertial force may be generated by a centrifugal force. One suitable mixer that spins along more than one axis is a dual asymmetric centrifugal mixer, such as the DAC 400 FVZ available from Flacktek, Landrum, SC. A dual asymmetric centrifugal mixer provides simultaneous dual axis spinning that automatically reorients the article during spinning, which tends to pull uncured composition out of concave features of the article in a short period of time (e.g., 20, 15, or 10 seconds or less).

In a fifth aspect, a system is provided. The system comprises:

a) an apparatus according to embodiments of the first aspect; and b) an article comprising at least one photopolymerized composition.

In some embodiments, the article may be as described in detail above with respect to the second aspect. Optionally, the article comprises a plurality of layers of at least one photopolymerized composition. Suitable systems are shown in FIGS. 1B-1D, which each comprise an apparatus 1000 and an article 180 (e.g., a dental crown). The article is typically partially cured when placed in the chamber of the apparatus.

Methods

In a third aspect, a method of post-curing an article is provided. The method comprises:

a) obtaining an article;
b) placing the article in an apparatus, the apparatus comprising:
  1) a housing;
  2) a chamber disposed in the housing;
  3) at least one light source disposed within the housing;
  4) a user interface disposed on an exterior of the housing, the user interface comprising a display and a plurality of program switches configured to adjust at least three operational parameters of the apparatus; and
  5) a vacuum pump operatively connected to the chamber;
c) inputting a post-cure program or accessing a saved post-cure program through the user interface, the post-cure program comprising 1) light intensity provided by the at least one light source, 2) length of time of light provided by the at least one light source, and at least one of 3a) delay time between initiation of light provided by the at least one light source and initiation of vacuum pulled by the vacuum pump or 3b) delay time between initiation of vacuum pulled on an interior of the chamber by the vacuum pump and initiation of light provided by the at least one light source; and
d) running the post-cure program.

In a fourth aspect, another article is provided. The article is made by the method according embodiments of the third aspect. In some embodiments, the article comprises an orthodontic article or a dental restoration.

Figure 5:
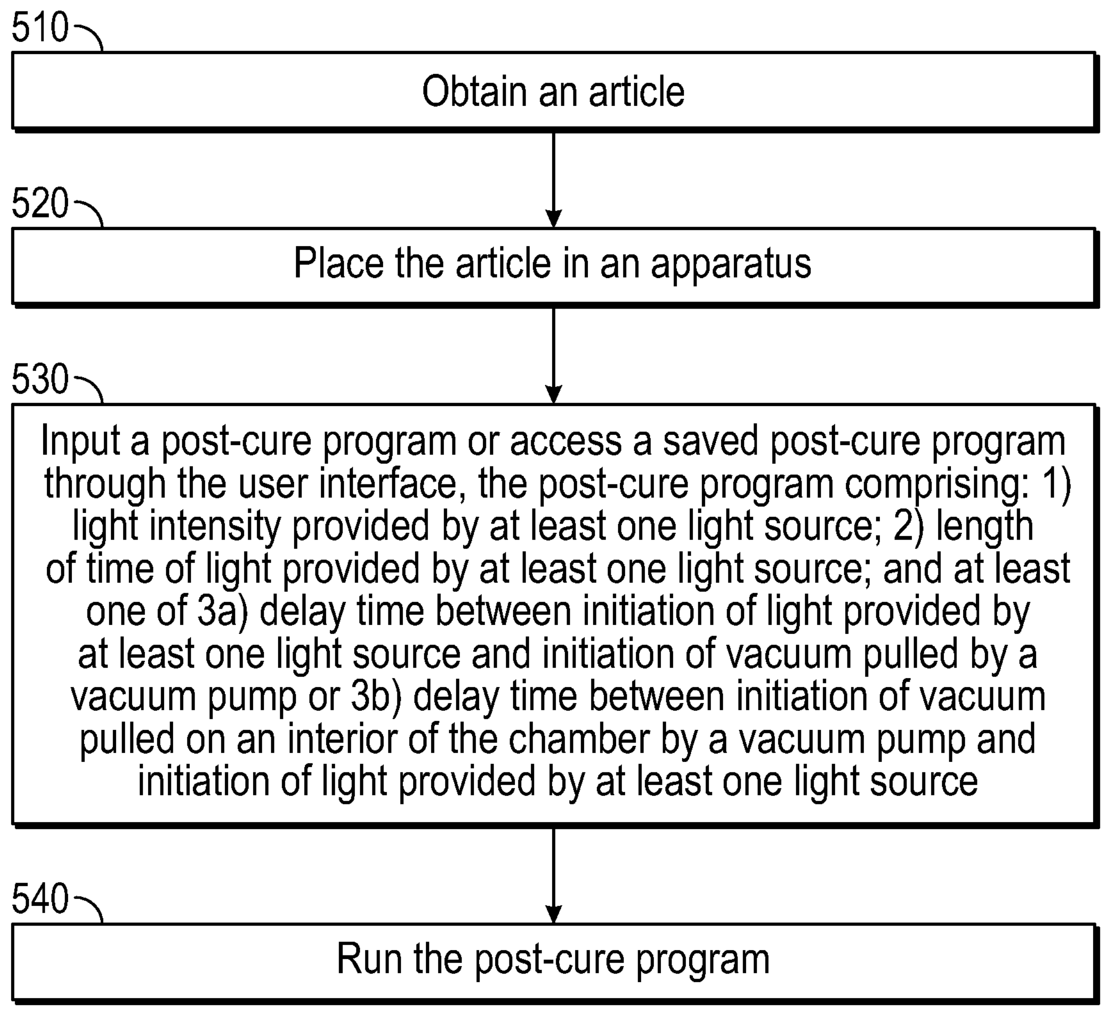
FIG. 5 is a flowchart of an exemplary process for post-curing an article.

Referring to FIG. 5, post-curing an article may comprise obtaining an article 510 and placing the article in an apparatus 520 (e.g., an apparatus according to the first aspect). The method further comprises, inputting a post-cure program or accessing a saved post-cure program through the user interface 530 and running the post-cure program 540. The program comprises 1) light intensity provided by at least one light source; 2) length of time of light provided by at least one light source; and at least one of 3a) delay time between initiation of light provided by at least one light source and initiation of vacuum pulled by a vacuum pump or 3b) delay time between initiation of vacuum pulled on an interior of the chamber by a vacuum pump and initiation of light provided by at least one light source. Suitable light sources include for instance and without limitation, LEDs, UV lamps, fluorescent tubes, and lasers. In certain embodiments, two light sources, three light sources, four light sources, or more, are used. As noted above, a single light source in one location also encompasses an array in that location.

In some embodiments, the article may be formed using additive manufacturing, such as described in detail above. The article optionally comprises a plurality of layers of at least one photopolymerized composition, which can be provided by obtaining a photopolymerizable composition; selectively curing the photopolymerizable composition using actinic radiation to form an article comprising a plurality of layers of at least one photopolymerized composition; and removing excess photopolymerizable composition from the article. Suitable photopolymerizable and photopolymerized compositions are discussed in detail above with respect to the article.

In some embodiments, the article may be formed using methods such as casting or molding.

Select Embodiments of the Disclosure

Embodiment 1 is an apparatus. The apparatus includes a) a housing; b) a chamber disposed in the housing; c) at least two light emitting diodes (LEDs) disposed within the housing; and a user interface disposed on an exterior of the housing. The chamber is configured to be adaptable to each of an open configuration, a closed configuration, and a hermetically sealed configuration, and the chamber includes a material transparent to actinic radiation. Light from the at least two LEDs enters the chamber from more than one direction. The user interface includes a display and a plurality of program switches configured to adjust at least three operational parameters of the apparatus. The apparatus further includes a vacuum pump operatively connected to the chamber.

Embodiment 2 is the apparatus of embodiment 1, wherein the at least three operational parameters include 1) light intensity provided by the at least two LEDs, 2) length of time of light provided by the at least two LEDs, and 3) delay time between initiation of light provided by the at least two LEDs and initiation of vacuum pulled on an interior of the chamber by the vacuum pump.

Embodiment 3 is the apparatus of embodiment 1, wherein the at least three operational parameters include 1) light intensity provided by the at least two LEDs, 2) length of time of light provided by the at least two LEDs, and 3) delay time between initiation of vacuum pulled on an interior of the chamber by the vacuum pump and initiation of light provided by the at least two LEDs.

Embodiment 4 is the apparatus of any of embodiments 1 to 3, further including a processor, wherein the processor causes the at least two LEDs to emit light and the vacuum pump to operate according to a program inputted through the user interface.

Embodiment 5 is the apparatus of embodiment 4, wherein the processor further includes a memory and is configured to cause the at least two LEDs to emit light and the vacuum pump to operate according to a program stored in the memory.

Embodiment 6 is the apparatus of any of embodiments 1 to 5, wherein the chamber includes a material transparent to actinic radiation having wavelengths at least between 250 nanometers (nm) and 900 nm.

Embodiment 7 is the apparatus of any of embodiments 1 to 6, wherein each of the at least two LEDs provide light having a peak wavelength between 250 nm and 500 nm.

Embodiment 8 is the apparatus of any of embodiments 1 to 7, wherein a first LED is positioned to direct light through a first major surface of the chamber and a second LED is positioned to direct light through an opposing second major surface of the chamber.

Embodiment 9 is the apparatus of any of embodiments 1 to 8, further including a reflective material positioned in the housing to reflect actinic radiation through a first major surface of the chamber or an opposing second major surface of the chamber.

Embodiment 10 is the apparatus of any of embodiments 1 to 9, wherein the chamber includes at least two glass walls through which actinic radiation enters the chamber.

Embodiment 11 is the apparatus of any of embodiments 1 to 10, wherein the chamber includes at least two quartz walls through which actinic radiation enters the chamber.

Embodiment 12 is the apparatus of any of embodiments 1 to 11, wherein the plurality of program switches includes at least one button, at least one dial, or a combination thereof.

Embodiment 13 is the apparatus of any of embodiments 1 to 12, wherein the user interface includes a touch screen that provides the display and the plurality of program switches.

Embodiment 14 is the apparatus of any of embodiments 1 to 13, wherein the at least two LEDs provide light having a peak wavelength between 360 nm and 460 nm.

Embodiment 15 is the apparatus of any of embodiments 1 to 14, further including a third LED positioned to direct light through a third major surface of the chamber, wherein the third major surface is directly adjacent to each of the first major surface and the second major surface. Embodiment 16 is the apparatus of embodiment 15, further including a fourth LED positioned to direct light through a fourth major surface of the chamber, wherein the fourth major surface is opposite the third major surface.

Embodiment 17 is the apparatus of any of embodiments 1 to 16, wherein the first major surface of the chamber is a floor of the chamber and the second major surface of the chamber is a lid of the chamber.

Embodiment 18 is the apparatus of any of embodiments 1 to 17, wherein the chamber further includes a connector configured to attach a gas source to the chamber.

Embodiment 19 is the apparatus of any of embodiments 1 to 18, further including a three-way valve operatively connected to the chamber, the three-way valve configured to operatively connect the chamber to the vacuum pump or the chamber to the gas source.

Embodiment 20 is the apparatus of any of embodiments 1 to 18, further including a first valve and a second valve each operatively connected to the chamber, the first valve configured to operatively connect the chamber to the vacuum pump and the second valve configured to operatively connect the chamber to the gas source.

Embodiment 21 is the apparatus of any of embodiments 18 to 20, wherein the plurality of program switches is further configured to adjust time of flushing the chamber with a gas from the gas source, pressure of flushing the chamber with the gas, or both.

Embodiment 22 is the apparatus of any of embodiments 18 to 21, wherein the gas source provides an inert gas.

Embodiment 23 is the apparatus of any of embodiments 1 to 22, wherein the user interface further comprises a start button.

Embodiment 24 is the apparatus of embodiment 23, wherein the start button is configured to initiate light being provided by the at least two LEDs.

Embodiment 25 is the apparatus of embodiment 24, wherein the start button is configured to initiate a program that has been entered through the user interface.

Embodiment 26 is the apparatus of any of embodiments 1 to 25, wherein the vacuum pump is disposed exterior to the housing.

Embodiment 27 is the apparatus of any of embodiments 1 to 26, wherein the vacuum pump is disposed inside of the housing.

Embodiment 28 is the apparatus of any of embodiments 1 to 27, wherein the vacuum pump is configured to achieve an absolute pressure inside the chamber of 0.1 to 30 millibars (mbar), 5 to 20 mbar, or 0.1 to 10 mbar.

Embodiment 29 is the apparatus of any of embodiments 1 to 28, wherein the at least two LEDs provide a light intensity of 50 to 500 milliwatts per square centimeter ($mW/cm^2$) or 300 to 500 $mW/cm^2$.

Embodiment 30 is the apparatus of any of embodiments 1 to 29, further including at least two LEDs that provide light having a peak wavelength below 360 nm, above 460 nm, or both.

Embodiment 31 is an article. The article includes a plurality of layers of at least one photopolymerized crosslinked composition. Further, the article contains 0.1% by weight or less of extractable components, based on the total weight of the article, when extracted with 5 volume percent ethanol in water. The article is made by a process including a) obtaining a photopolymerizable composition; b) selectively curing the photopolymerizable composition using actinic radiation to form an article having a plurality of layers of at least one photopolymerized composition; c) removing excess photopolymerizable composition from the article; d) placing the article in the apparatus of the first aspect; e) inputting a post-cure program or accessing a saved program through the user interface; and f) running the post-cure program. The post-cure program includes i) light intensity provided by the at least two LEDs, ii) length of time of light provided by the at least two LEDs, and at least one of iiia) delay time between initiation of light provided by the at least two LEDs and initiation of vacuum pulled by the vacuum pump or iiib) delay time between initiation of vacuum pulled on an interior of the chamber by the vacuum pump and initiation of light provided by the at least two LEDs.

Embodiment 32 is the article of embodiment 31, wherein the article is an orthodontic article or a dental restoration.

Embodiment 33 is the article of embodiment 31 or embodiment 32, wherein the photopolymerizable composition includes 20 to 60 wt. % of ceramic particles, based on the total weight of the photopolymerizable composition.

Embodiment 34 is the article of embodiment 31 or embodiment 32, wherein the photopolymerizable composition includes 3 to 45 vol. % of ceramic particles, based on the total volume of the photopolymerizable composition.

Embodiment 35 is the article of embodiment 33 or embodiment 34, wherein the ceramic particles include metal oxide ceramic particles, non-oxide ceramic particles, or combinations thereof.

Embodiment 36 is the article of any of embodiments 33 to 35, wherein the ceramic particles are selected from the group consisting of zirconia, silica, alumina, yttria, ceria, magnesium-magnesia aluminate (MMA), magnesium oxide, hydroxyapatite, fluorapatite, chlorapatite, calcite, cordierite, silicon carbide, silicon nitride, boron carbide, titanium diboride, zirconium diboride, boron nitride, titanium carbide, zirconium carbide, aluminum nitride, calcium hexaboride, MAX phase, and combinations thereof.

Embodiment 37 is the article of any of embodiments 31 to 36, wherein the photopolymerizable composition further comprises at least one photoinitiator.

Embodiment 38 is the article of any of embodiments 31 to 37, wherein the photopolymerizable composition includes at least one of a (meth)acryl component, an epoxy component, a polyalkylene component, a polyalkylene oxide component, a polyester component, a polycarbonate component, a urethane component, a polyamide component, a thiol component and an ene component that is different from the (meth)acryl component, or combinations thereof.

Embodiment 39 is the article of any of embodiments 31 to 38, wherein the photopolymerized composition includes a (meth)acryl polymer and at least one ceramic material, a urethane (meth)acryl polymer, a polyalkylene oxide (meth) acryl polymer, a polyalkylene oxide urethane (meth)acryl polymer, a polyester urethane (meth)acryl polymer, a polycarbonate urethane (meth)acryl polymer, a polyamide polymer, an epoxy (meth)acrylate polymer, a thioether polymer, or combinations thereof.

Embodiment 40 is a method of post-curing an article. The method includes a) obtaining an article; b) placing the article in an apparatus; c) inputting a post-cure program or accessing a saved program through the user interface; and d) running the post-cure program. The apparatus includes 1) a housing; 2) a chamber disposed in the housing; 3) at least one light source disposed within the housing; 4) a user interface disposed on an exterior of the housing, the user interface comprising a display and a plurality of program switches configured to adjust at least three operational parameters of the apparatus; and 5) a vacuum pump operatively connected to the chamber. The post-cure program includes i) light intensity provided by the at least one light source, ii) length of time of light provided by the at least one light source, and at least one of iiia) delay time between initiation of light provided by the at least one light source and initiation of vacuum pulled by the vacuum pump or iiib) delay time between initiation of vacuum pulled on an interior of the chamber by the vacuum pump and initiation of light provided by the at least one light source.

Embodiment 41 is the method of embodiment 40, wherein the chamber is configured to be adaptable to each of an open configuration, a closed configuration, and a hermetically sealed configuration.

Embodiment 42 is the method of embodiment 40 or embodiment 41, wherein the chamber includes a material transparent to actinic radiation having wavelengths at least between 250 nanometers (nm) and 900 nm.

Embodiment 43 is the method of any of embodiments 40 to 42, wherein the at least one light source includes a light emitting diode (LED).

Embodiment 44 is the method of embodiment 43, wherein the at least one LED provides light having a peak wavelength between 250 nm and 500 nm.

Embodiment 45 is the method of any of embodiments 40 to 44, wherein a first LED is positioned to direct light through a first major surface of the chamber and a second LED positioned to direct light through an opposing second major surface of the chamber.

Embodiment 46 is the method of any of embodiments 40 to 45, further including a reflective material positioned in the housing to reflect actinic radiation through a first major surface of the chamber or an opposing second major surface of the chamber.

Embodiment 47 is the method of any of embodiments 40 to 46, wherein the article is formed using additive manufacturing.

Embodiment 48 is the method of any of embodiments 40 to 47, wherein providing the article includes I) obtaining a photopolymerizable composition; II) selectively curing the photopolymerizable composition using actinic radiation to form an article including a plurality of layers of at least one photopolymerized composition; and III) removing excess photopolymerizable composition from the article.

Embodiment 49 is an article made by the method of any of embodiments 40 to 48.

Embodiment 50 is the article of embodiment 49, wherein the article is an orthodontic article or a dental restoration.

Embodiment 51 is the article of embodiment 49 or embodiment 50, comprising 0.1% by weight or less of extractable components, based on the total weight of the article, when extracted with 5 volume percent ethanol in water.

Embodiment 52 is a system. The system includes a) an apparatus of any of embodiments 1 to 30; and b) an article including at least one photopolymerized composition.

Embodiment 53 is the system of embodiment 52, wherein the article includes a plurality of layers of at least one photopolymerized composition.

Embodiment 54 is the system of embodiment 52 or 53, wherein the article is partially cured.

Embodiment 55 is the system of any of embodiments 52 to 54, wherein the article is an orthodontic article or a dental restoration.

EXAMPLES

Objects and advantages of this disclosure are further illustrated by the following examples, but the particular materials and amounts thereof recited in these examples, as well as other conditions and details, should not be construed to unduly limit this disclosure. Unless otherwise noted or otherwise apparent from the context, all parts, percentages, ratios, etc. in the Examples and the rest of the specification are by weight.

Example 1—Prophetic

An all-composite dental crown is formed using 3M ESPE SINFONY paste (available from 3M ESPE, St. Paul, MN) by building up the crown on a model in layers of at least one selected color of paste (e.g., including Opaque paste O A0-O D4, Dentin paste D A0-D D4, Incisal paste E1-E4, Intensive-Opaque paste IO 1-IO 5, Opaque-Dentin paste DO1-DO 5, Enamel-effect paste E5-E6, Magic Intensive paste I1-I11, and/or Transparent-Opal paste T1-T4), each layer having a maximum 1 millimeter thickness. Each layer is polymerized using a VISIO Alfa curing device (available from 3M ESPE) prior to applying the next layer. Next, the crown is lifted off the model and placed in the apparatus according to the first aspect described in detail above. Final polymerization of the dental crown is conducted in the apparatus for 1 minute of light exposure using a wavelength spectrum of 400-500 nm without vacuum, followed by 14 minutes of light exposure with vacuum of 0.1 mbar, also at a wavelength spectrum 400-500 nm.

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. An apparatus comprising:

a) a housing;

b) a chamber disposed in the housing, the chamber configured to be adaptable to each of an open configuration, a closed configuration, and a hermetically sealed configuration, wherein the chamber comprises a material transparent to actinic radiation;

c) at least two light emitting diodes (LEDs) disposed within the housing, wherein light from the at least two LEDs enters the chamber from more than one direction, wherein a first LED is positioned to direct light through a first major surface of the chamber and a second LED is positioned to direct light through an opposing second major surface of the chamber;

d) a user interface disposed on an exterior of the housing, the user interface comprising a display and a plurality of program switches configured to adjust at least three operational parameters of the apparatus, wherein the at least three operational parameters comprise; 1) light intensity provided by the at least two LEDs, 2) length of time of light provided by the at least two LEDs, and at least one of: 3a) a first delay time parameter corresponding to a delay time between initiation of light provided by the at least two LEDs and initiation of vacuum pulled on an interior of the chamber, or 3b) a second delay time parameter corresponding to a delay time between initiation of vacuum pulled on the interior of the chamber and initiation of light provided by the at least two LEDs;

e) a vacuum pump operatively connected to the chamber; and f) a processor electronically coupled to the user interface, wherein the processor causes the at least two LEDs to emit light and the vacuum pump to operate according to a program inputted through the plurality of program switches, and wherein the processor is configured with one or more preconfigured values for at least one of the first delay time parameter or the second delay time parameter.

2. The apparatus of claim 1, wherein the processor further comprises a memory storing the program and is configured to cause the at least two LEDs to emit light and the vacuum pump to operate according to the program.

3. The apparatus of claim 1, wherein the user interface comprises a touch screen that provides the display and the plurality of program switches.

4. The apparatus of claim 1, further comprising a third LED positioned to direct light through a third major surface of the chamber, wherein the third major surface is directly adjacent to each of the first major surface and the second major surface.

5. The apparatus of claim 1, wherein the chamber further comprises a connector configured to attach a gas source to the chamber.

6. The apparatus of claim 5, wherein the plurality of program switches is further configured to adjust time of flushing the chamber with a gas from the gas source, pressure of flushing the chamber with the gas, or both.

7. The apparatus of claim 1, wherein the vacuum pump is configured to achieve an absolute pressure inside the chamber of 0.1 to 30 millibars (mbar).

8. The apparatus of claim 1, wherein the one or more preconfigured values correspond to a predetermined time range or discrete time intervals.

9. The apparatus of claim 1, wherein the program is entered via the user interface, wherein the processor is configured to initiate the program using an activation mechanism, and wherein the activation mechanism, when activated, causes the at least two LEDs and the vacuum pump to operate according to the program.

* * * * *